(12) United States Patent
Kronsteiner et al.

(10) Patent No.: US 11,135,910 B2
(45) Date of Patent: Oct. 5, 2021

(54) ELECTRIC KART AND BATTERY

(71) Applicants: BRP-ROTAX GMBH & CO. KG, Gunskirchen (AT); SOLAREDGE e-MOBILITY S.p.A., Perugia (IT)

(72) Inventors: Dominik Kronsteiner, Vorchdorf (AT); Heinz Kusel, Pennewang (AT); Stefan Gruber, Roitham (AT); Giuliano Tironzelli, Montecastelli (IT); Emilio Stopponi, Montecastelli (IT)

(73) Assignees: BRP-ROTAX GMBH & CO. KG, Gunskirchen (AT); SOLAREDGE e-MOBILITY S.P.A., Perugia (IT)

( * ) Notice: Subject to any disclaimer, the term of this patent is extended or adjusted under 35 U.S.C. 154(b) by 51 days.

(21) Appl. No.: 16/014,553

(22) Filed: Jun. 21, 2018

(65) Prior Publication Data

US 2018/0370368 A1 Dec. 27, 2018

Related U.S. Application Data

(60) Provisional application No. 62/524,601, filed on Jun. 25, 2017.

(51) Int. Cl.
*B60K 1/04* (2019.01)
*H02J 7/00* (2006.01)
(Continued)

(52) U.S. Cl.
CPC .............. *B60K 1/04* (2013.01); *B60L 3/0046* (2013.01); *B60L 11/1805* (2013.01);
(Continued)

(58) Field of Classification Search
CPC ...... B60L 11/1805; B60L 50/64; B60L 50/52; B60L 50/66; B60L 53/80; B60L 58/26;
(Continued)

(56) References Cited

U.S. PATENT DOCUMENTS 3,533,484 A 10/1970 Wood
4,042,055 A * 8/1977 Ward ...................... B60L 58/21
180/60

(Continued)

FOREIGN PATENT DOCUMENTS

DE 10348385 A1 5/2005
EP 2107632 A1 10/2009
ES 2453017 A1 4/2014

OTHER PUBLICATIONS

European Search Report of European Application 18179287.0; Stefan Rother; Munich; Aug. 15, 2018.
(Continued)

*Primary Examiner* — Erez Gurari
(74) *Attorney, Agent, or Firm* — BCF LLP

(57) ABSTRACT

An electric kart has a frame, a seat, four wheels, an electric motor operatively connected to two of the wheels, and at least one battery operatively connected to the electric motor. The at least one battery has a support structure mounted to the frame of the electric kart, and battery cells positioned on the support structure such that there is at least one air passage defined between the battery cells. Air passes through the at least one air passage when the electric kart is in motion to cool at least some of the battery cells. A battery for an electric kart is also disclosed.

16 Claims, 20 Drawing Sheets

(51) Int. Cl.
  *H01M 10/625* (2014.01)
  *H01M 10/613* (2014.01)
  *B60L 50/64* (2019.01)
  *B60L 50/52* (2019.01)
  *B60L 53/80* (2019.01)
  *B60L 58/26* (2019.01)
  *B60L 50/60* (2019.01)
  *H01M 2/10* (2006.01)
  *H01M 10/6562* (2014.01)
  *H01M 10/42* (2006.01)
  *B60L 3/00* (2019.01)
  *B60L 11/18* (2006.01)
  *B60K 1/00* (2006.01)

(52) U.S. Cl.
  CPC ........... *B60L 50/52* (2019.02); *B60L 50/64*
  (2019.02); *B60L 50/66* (2019.02); *B60L 53/80*
  (2019.02); *B60L 58/26* (2019.02); *H01M*
  *2/1077* (2013.01); *H01M 2/1083* (2013.01);
  *H01M 10/425* (2013.01); *H01M 10/613*
  (2015.04); *H01M 10/625* (2015.04); *H01M*
  *10/6562* (2015.04); *H02J 7/0029* (2013.01);
  *B60G 2300/26* (2013.01); *B60K 2001/001*
  (2013.01); *B60K 2001/005* (2013.01); *B60K*
  *2001/0405* (2013.01); *B60K 2001/0455*
  (2013.01); *B60L 2200/22* (2013.01); *B60Y*
  *2200/114* (2013.01); *H01M 2010/4271*
  (2013.01); *H01M 2220/20* (2013.01)

(58) Field of Classification Search
  CPC .. B60L 3/0046; B60L 2200/22; H02J 7/0029;
  H01M 10/625; H01M 10/613; H01M
  10/6562; H01M 10/425; H01M 2/1083;
  H01M 2/1077; H01M 2010/4271; H01M
  2220/20; B60K 1/04; B60K 2001/001;
  B60K 2001/005; B60K 2001/0405; B60K
  2001/0455; B60G 2300/26; B60Y
  2200/114
  See application file for complete search history.

(56) References Cited

U.S. PATENT DOCUMENTS

| | | | | |
|---|---|---|---|---|
| 7,000,727 B2* | 2/2006 | Korenjak | ............... | B60K 17/04 180/292 |
| 2004/0142238 A1* | 7/2004 | Asahina | ............. | H01M 10/6551 429/176 |
| 2006/0028183 A1* | 2/2006 | Izawa | ................. | H01M 10/486 320/150 |
| 2006/0093901 A1* | 5/2006 | Lee | .................... | H01M 10/652 429/120 |
| 2007/0133151 A1* | 6/2007 | Jeon | ................... | H01M 10/6555 361/600 |
| 2010/0143782 A1* | 6/2010 | Kruger | ................ | H01M 10/613 429/120 |
| 2011/0104548 A1* | 5/2011 | Saito | ................. | H01M 10/6566 429/120 |
| 2011/0206948 A1* | 8/2011 | Asai | ................... | H01M 10/6556 429/7 |
| 2011/0318625 A1* | 12/2011 | Yajima | ................ | H01M 10/613 429/120 |
| 2012/0028099 A1* | 2/2012 | Aoki | ................... | H01M 10/647 429/120 |
| 2012/0121959 A1* | 5/2012 | Yamada | ............ | H01M 10/6561 429/100 |
| 2012/0121962 A1* | 5/2012 | Katayama | ......... | H01M 10/6554 429/120 |
| 2012/0129031 A1* | 5/2012 | Kim | ................... | H01M 10/6555 429/120 |
| 2013/0025950 A1* | 1/2013 | Brandon | .................. | B60K 1/04 180/65.1 |
| 2013/0122337 A1* | 5/2013 | Katayama | ........... | H01M 10/613 429/83 |
| 2013/0146373 A1* | 6/2013 | Kosaki | ...................... | B60K 1/04 180/65.1 |
| 2013/0298586 A1* | 11/2013 | Hwang | ................ | H01M 10/663 62/239 |
| 2013/0344358 A1* | 12/2013 | Colibert | ............ | H01M 10/6561 429/83 |
| 2013/0344370 A1* | 12/2013 | Kinoshita | ........... | H01M 10/647 429/120 |
| 2014/0072835 A1* | 3/2014 | Tsujimura | ........... | H01M 10/613 429/7 |
| 2014/0079977 A1* | 3/2014 | Tsujimura | ........... | H01M 2/1077 429/120 |
| 2014/0220391 A1* | 8/2014 | Fujii | ....................... | B60L 50/66 429/7 |
| 2014/0262573 A1* | 9/2014 | Ito | ........................ | H01M 10/613 180/68.5 |
| 2014/0295224 A1* | 10/2014 | Inoue | .................. | H01M 10/613 429/62 |
| 2015/0010782 A1* | 1/2015 | Tanigaki | .................. | B60L 58/27 429/7 |
| 2015/0037632 A1* | 2/2015 | Yamamoto | .......... | H01M 2/1077 429/82 |
| 2015/0200428 A1* | 7/2015 | Pekarsky | .......... | H01M 10/6568 429/120 |
| 2015/0270589 A1* | 9/2015 | Ejiri | .................... | H01M 2/1016 429/72 |
| 2015/0380784 A1* | 12/2015 | Bass | ................. | H01M 10/6569 429/120 |
| 2016/0064783 A1* | 3/2016 | Chorian | .............. | H01M 10/613 429/72 |
| 2016/0111761 A1* | 4/2016 | Kopra | ................. | H01M 10/625 429/120 |
| 2016/0141569 A1* | 5/2016 | Mascianica | ....... | H01M 10/6556 429/99 |
| 2016/0315297 A1* | 10/2016 | Wu | ...................... | H01M 10/625 |
| 2017/0005305 A1* | 1/2017 | Harris | ............... | H01M 10/6567 |
| 2017/0005380 A1* | 1/2017 | Harris | ................. | H01M 10/625 |
| 2017/0012330 A1* | 1/2017 | Kim | .................. | H01M 10/663 |
| 2017/0194680 A1* | 7/2017 | Muck | ................. | H01M 10/6556 |
| 2017/0279172 A1* | 9/2017 | Tucker | ............. | H01M 10/6568 |
| 2018/0040930 A1* | 2/2018 | Addanki | ........... | H01M 10/663 |
| 2018/0040933 A1* | 2/2018 | Inoue | ......................... | H01M 2/10 |
| 2018/0097265 A1* | 4/2018 | Tarlau | ................ | H01M 2/1077 |
| 2018/0162447 A1* | 6/2018 | Fees | ......................... | B60K 1/00 |
| 2018/0175468 A1* | 6/2018 | Shin | ......................... | H01M 2/10 |
| 2018/0358664 A1* | 12/2018 | Zhang | ................ | H01M 10/643 |
| 2018/0370368 A1* | 12/2018 | Kronsteiner | ........ | H01M 10/425 |
| 2019/0120563 A1* | 4/2019 | Nguyen | ............. | B60H 1/00278 |
| 2019/0190100 A1* | 6/2019 | Chen | .................. | H01M 2/1083 |
| 2020/0031215 A1* | 1/2020 | Ito | ............................ | B60L 50/66 |
| 2020/0136209 A1* | 4/2020 | Dede | .................... | H01M 10/613 |

OTHER PUBLICATIONS

English Abstract of DE10348385; Retrieved on Aug. 23, 2018; Retrieved from www.worldwide.espacenet.com.
English Machine Translation of ES2453017A1 retrieved from http://translationportal.epo.org/ on Jun. 21, 2018.

* cited by examiner

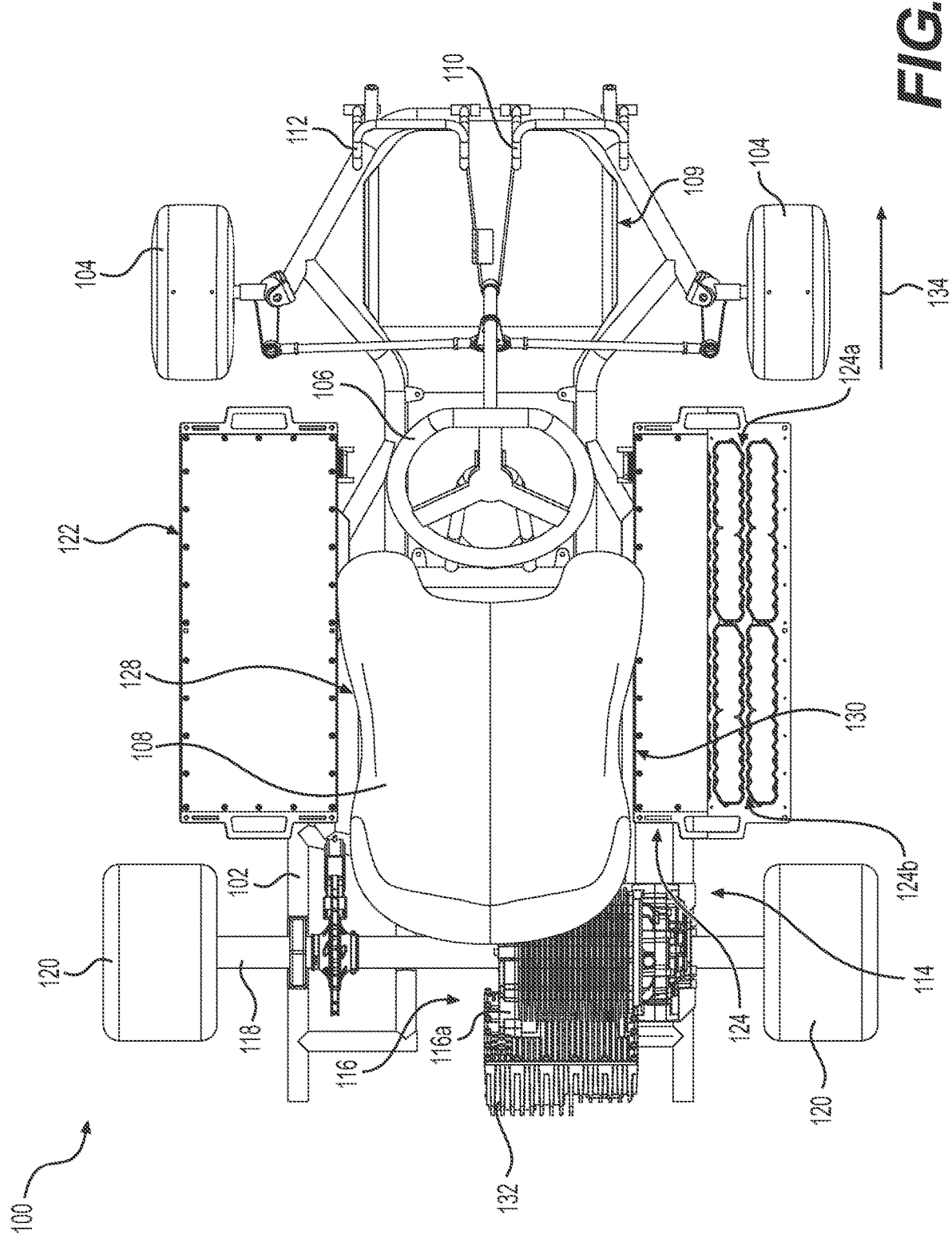

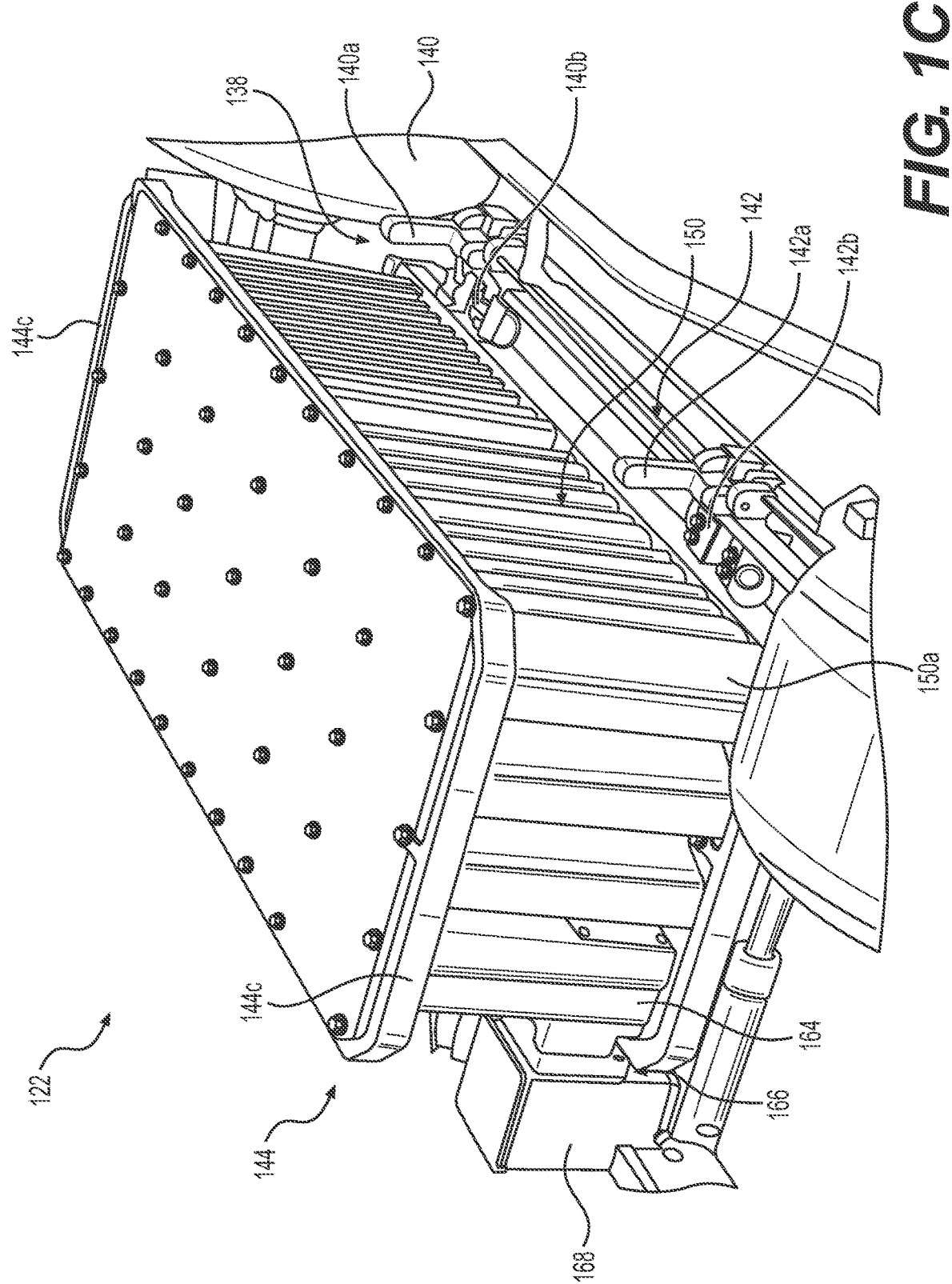

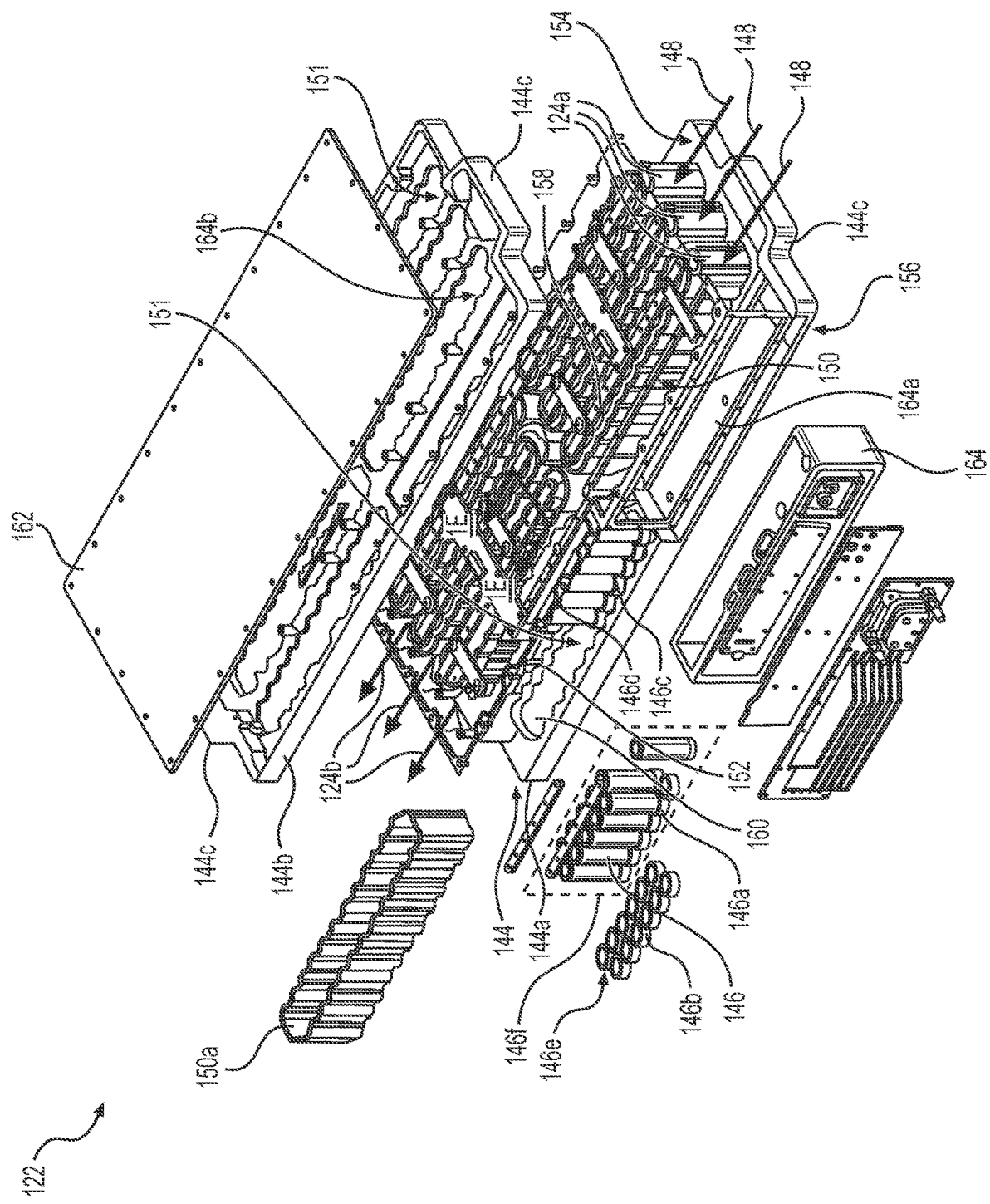

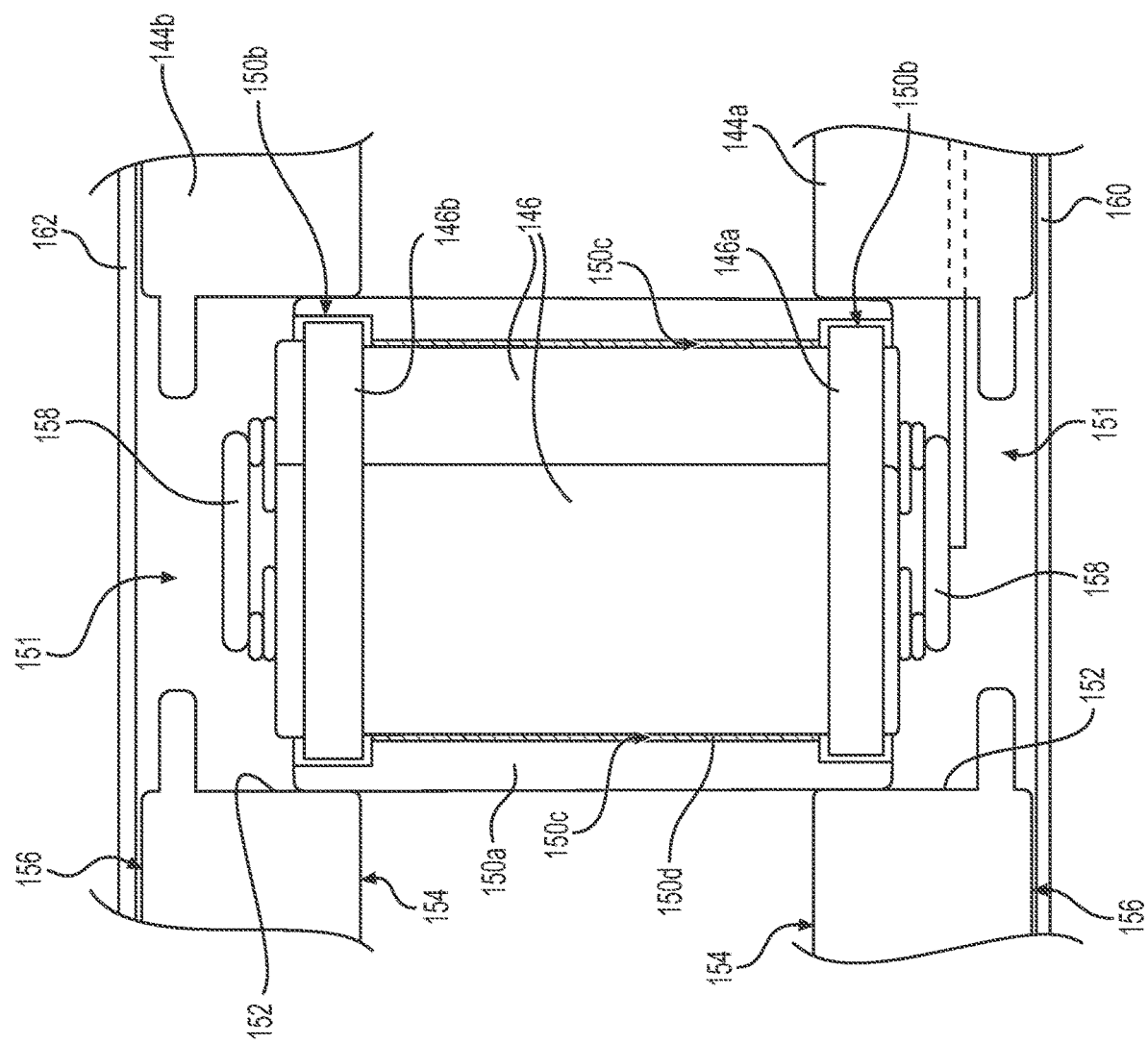

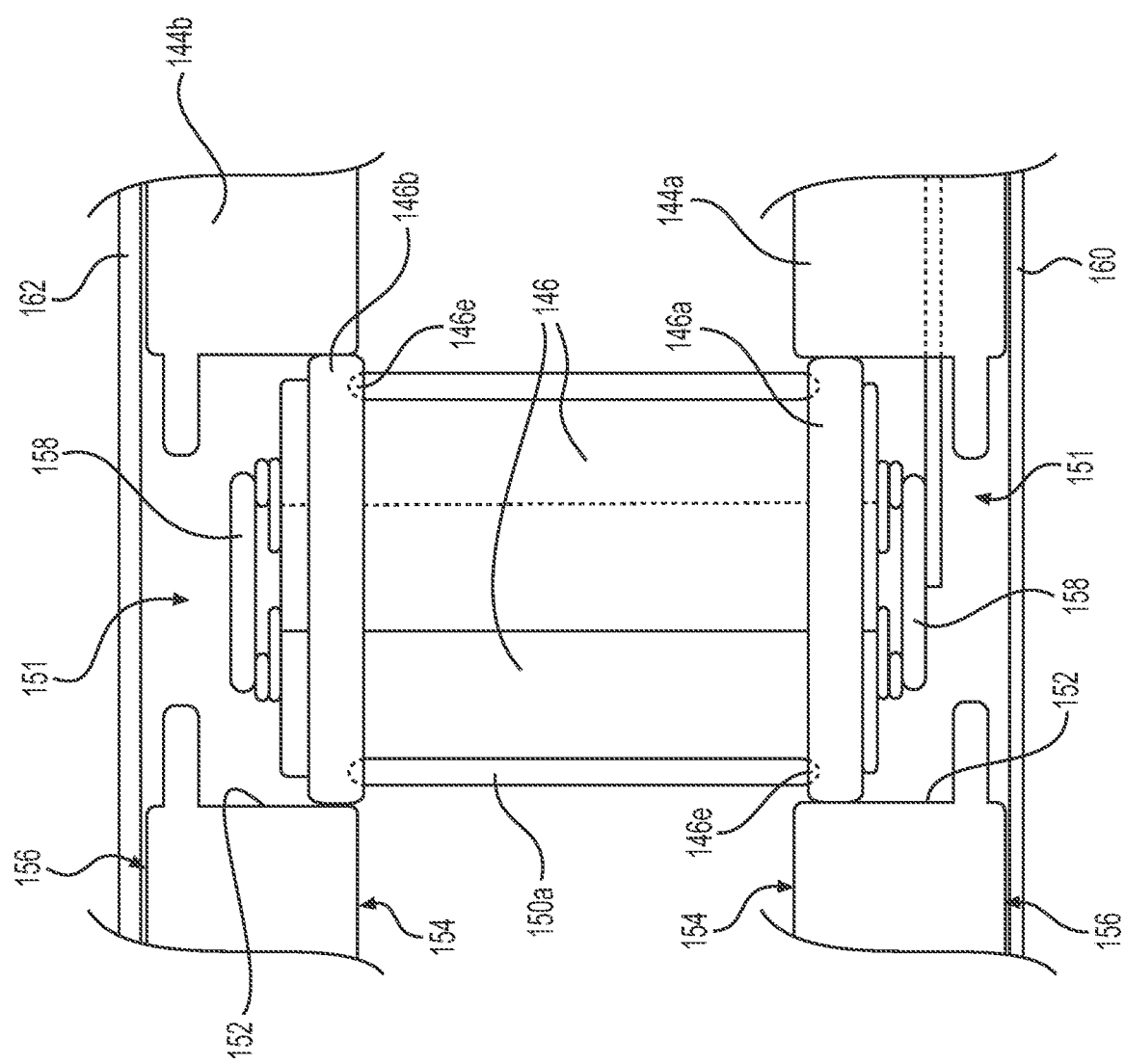

ELECTRIC KART AND BATTERY

CROSS-REFERENCE

The present application claims priority to U.S. Provisional Patent Application No. 62/524,601, filed Jun. 25, 2017, the entirety of which is incorporated herein by reference.

TECHNICAL FIELD

The technology disclosed herein relates to batteries for powering electric karts and electric karts having such batteries.

BACKGROUND

Many electric karts and batteries for electric karts are known.

For example, U.S. Patent Publication No. 2013/0025950A1, published on Jan. 31, 2013, describes an electric kart with one or more lightweight, quick-change batteries or battery packs mounted on the kart frame. The kart body has battery pack access openings to provide easy access to remove and replace battery packs during racing operations. The batteries are easily removed and replaced so that a particular kart can be "refueled" in a matter of seconds. The batteries being removed are placed on a charger, and can be placed back into service relatively quickly. Lithium Ion batteries could be used for the battery packs.

Prior art electric karts and batteries have a number of limitations. For example, one problem often occurs in racing operations, where electric kart batteries tend to heat up beyond temperatures at which the batteries operate most efficiently. Another problem is that, at least in some types of batteries, overheating causes a reduction of usable battery life and electrical charge storage capacity.

SUMMARY

In view of the problems with the prior art, it would be desirable to provide electric karts and batteries that could be used with such karts that attempt to address these problems.

In this document, the term battery cell refers to any suitable electrical device that stores electrical energy and provides an electrical output at a given voltage when charged. The term battery refers to an arrangement of battery cells that are electrically interconnected to provide a battery output voltage. The term battery output voltage refers to a voltage that results from and is determined by how the battery cells are interconnected (e.g., via parallel electrical connections only, via series electrical connections only, or via a combination of parallel and series electrical connections).

For example, where two battery cells are interconnected electrically in parallel, the battery output voltage is the same as the voltage of each of the two battery cells. As another example, where two battery cells are interconnected electrically in series, the battery output voltage is a sum of the voltages of the two battery cells.

In one aspect, the present technology provides an electric kart having at least one air-cooled battery. Each battery includes a plurality of battery cells and at least one air passage defined between the battery cells. When the electric kart is in motion, ambient air passes through the air passage of each battery to cool the battery cells of that battery. The cooling provided by the air passage may reduce an extent of heating up of battery cells, and may also reduce a risk of overheating of battery cells.

Each battery is positioned such that when the electric kart is in motion, the motion of the electric kart induces airflow through the air passage of each battery. More particularly, each air passage has two open ends that are fluidly interconnected, and the batteries are positioned such that one open end of each passage faces straight forward. As a result, the open end of the air passage moves against air and some of that air passes through the air passage.

It is contemplated that the batteries described in this document could be manufactured and sold separately from electric karts. It is also contemplated that the batteries described in this document could be used in applications other than electric kart applications.

In one aspect, the present technology provides an electric kart that comprises a frame, a driver seat mounted to the frame, two front wheels and two rear wheels operatively connected to the frame, an electric motor operatively connected to the two rear wheels to drive the two rear wheels, and at least one battery operatively connected to the electric motor to power the electric motor to drive the electric kart.

The at least one battery has a support structure mounted to the frame of the electric kart, and a first plurality of battery cells and a second plurality of battery cells positioned on the support structure such that there is an air passage defined between the first plurality of battery cells and the second plurality of battery cells.

The air passage is configured for allowing passage of air to cool at least some battery cells of at least one of the first and second pluralities of battery cells when the electric kart is in motion.

In another aspect, the air passage has a first open end and a second open end fluidly connected to the first open end. In a further aspect, the air passage is positioned such that when the electric kart is in a straight forward motion, air passes in the air passage from the first open end to the second open end.

In some implementations, the at least one battery includes a first heat exchanger and a second heat exchanger positioned on the support structure. The first heat exchanger and the second heat exchanger define the air passage therebetween. In some implementations, the first plurality of battery cells is disposed inside the first heat exchanger, and the second plurality of battery cells is disposed inside the second heat exchanger.

In some implementations, the support structure of the at least one battery includes a bottom portion mounted to the frame of the electric kart and a top portion spaced from the bottom portion. In such implementations, the first heat exchanger includes a first sleeve that extends between the bottom and top portions of the support structure, and the second heat exchanger includes a second sleeve that extends between the bottom and top portions of the support structure. The first plurality of battery cells is received in the first sleeve. The second plurality of battery cells is received in the second sleeve.

In some implementations, the first heat exchanger includes a first rack disposed inside the first sleeve, the second heat exchanger includes a second rack disposed inside the second sleeve, at least some battery cells of the first plurality of battery cells are mounted to the first rack, and at least some battery cells of the second plurality of battery cells are mounted to the second rack.

In some implementations, the first sleeve has a first plurality of recesses, each recess of the first plurality of recesses has a battery cell of the first plurality of battery cells received therein, the second sleeve has a second plurality of recesses, and each recess of the second plurality of recesses has a battery cell of the second plurality of battery cells received therein.

In some implementations, the first heat exchanger includes a first rack disposed inside the first sleeve, the first sleeve has a first plurality of recesses, the first rack and the first plurality of recesses define a first plurality of receptacles, the first plurality of battery cells is received in the first plurality of recesses, the second heat exchanger includes a second rack disposed inside the second sleeve, the second sleeve has a second plurality of recesses, the second rack and the second plurality of recesses define a second plurality of receptacles, and the second plurality of battery cells is received in the second plurality of recesses.

In some implementations, each battery cell of the first plurality of battery cells contacts the first sleeve and at least one other battery cell of the first plurality of battery cells, and each battery cell of the second plurality of battery cells contacts the second sleeve and at least one other battery cell of the second plurality of battery cells.

In some implementations, the first heat exchanger includes a first rack and a second rack, the first sleeve is positioned between the first rack and the second rack, the second heat exchanger includes a third rack and a fourth rack, and the second sleeve is positioned between the third rack and the fourth rack.

In some implementations, each of the first and second racks includes a plurality of receptacles, each of the receptacles of the first and second racks has one battery cell of the first plurality of battery cells received therein, each of the third and fourth racks includes a plurality of receptacles, and each of the receptacles of the third and fourth racks has one battery cell of the second plurality of battery cells received therein.

In some implementations, the first plurality of battery cells is arranged into at least two rows of battery cells, and the second plurality of battery cells is arranged into at least two rows of battery cells.

In some implementations, the at least one air passage is a first air passage defined by the first and second sleeves, and the at least one battery includes: a) a third heat exchanger having a third sleeve that extends between the bottom and top portions of the support structure, the third sleeve and at least one of the first and second sleeves defining a second air passage therebetween, and b) a third plurality of battery cells received in the third sleeve.

In some implementations, the at least one battery includes a battery management module that is electrically connected to at least some battery cells of the first and second pluralities of battery cells.

In some implementations, the electric motor is positioned rearward of the driver seat.

In some implementations, the at least one battery includes a first battery and a second battery, the first battery is mounted to the frame of the electric kart at least partially on one side of the driver seat, and the second battery is mounted to the frame of the electric kart at least partially on another side of the driver seat.

In some implementations, at least one of: a) the frame of the electric kart, and b) the at least one battery, includes a fastener to fasten the at least one battery to the frame of the electric kart; and the at least one battery is mounted to the frame of the electric kart via the fastener.

In another aspect, the present technology provides a battery that comprises a support structure, a plurality of battery cells, and a plurality of sleeves, each sleeve of the plurality of sleeves having at least one battery cell of the plurality of battery cells received therein, and the plurality of sleeves being positioned on the support structure to define at least one air passage between at least two sleeves of the plurality of sleeves.

In some implementations, the battery further comprises at least one rack received in the support structure. In such implementations, the plurality of battery cells is one of: a) mounted to and b) received in, the at least one rack.

In some implementations, each sleeve of the plurality of sleeves has a plurality of recesses, and each recess of the plurality of recesses has at least one battery cell received therein.

In some implementations, the battery further comprises a battery management module that is positioned on the support structure and is electrically connected to the plurality of battery cells.

In some implementations, the battery includes a battery management module sleeve positioned on the support structure to define an additional air passage between the battery management module sleeve and at least one sleeve of the plurality of sleeves, and the battery management module is received in the battery management module sleeve.

The exemplary implementations described in this document are intended to aid the reader in understanding the principles of the present technology and not to limit its scope to such specifically recited implementations.

BRIEF DESCRIPTION OF THE DRAWINGS

The drawings included herewith are for illustrating various implementations of articles, products, methods, and apparatuses described in the present specification. The drawings could not be to scale. Some features shown in the drawings could be exaggerated, or scaled down, relative to their possible "life" size(s), in order to make these features clearly visible in the drawings.

In the drawings:

FIG. 1A is a top plan view of an electric kart, according to one implementation;

FIG. 1C is a perspective view taken from a front, left side of a left-side battery of the electric kart of FIGS. 1A and 1B;

FIG. 1D is a partially exploded view of the battery of FIG. 1C;

FIG. 1E is a schematic cross-section of a part of the battery of FIGS. 1C and 1D, taken along section line 1E-1E of FIG. 1D;

FIG. 1F is a schematic section view of a part of the battery of FIGS. 1C and 1D, taken along section line 1E-1E of FIG. 1D, according to another implementation of the battery;

DETAILED DESCRIPTION

Figure 1B:
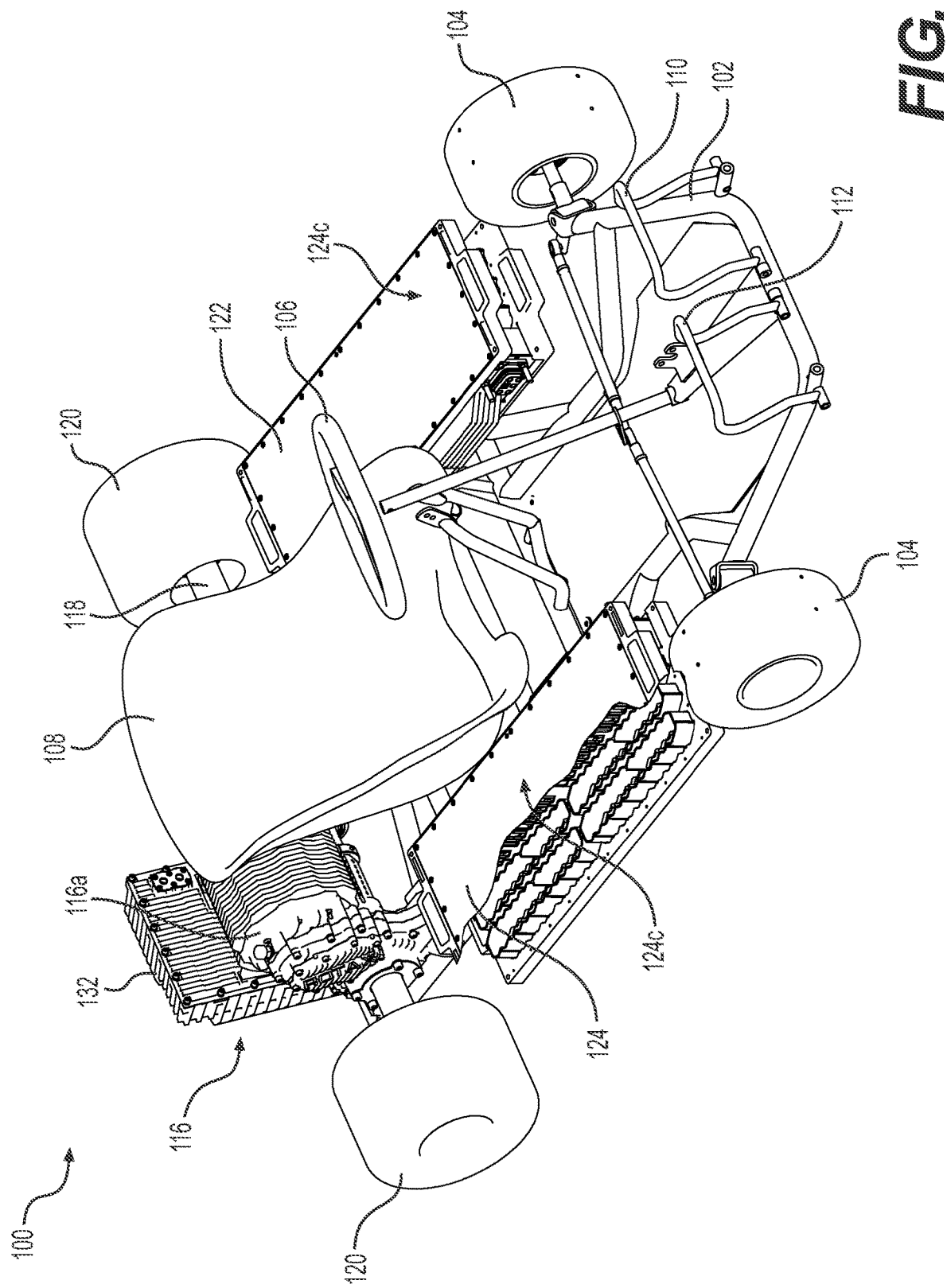
FIG. 1B is a perspective view taken from a front, right side of the electric kart of FIG. 1A.
Figure 2A:
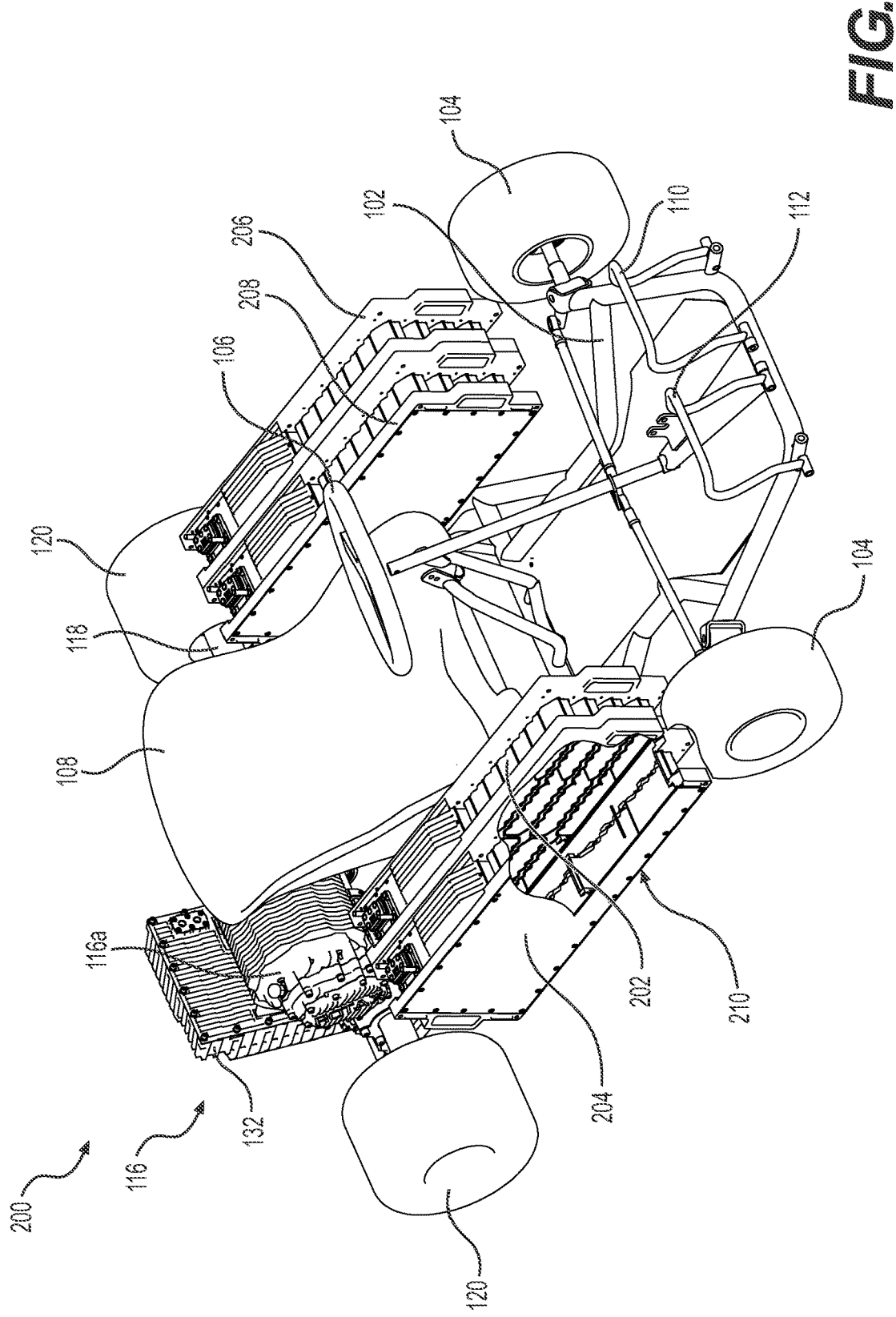
FIG. 2A is a perspective view of an electric kart, according to another implementation.
Figure 2B:
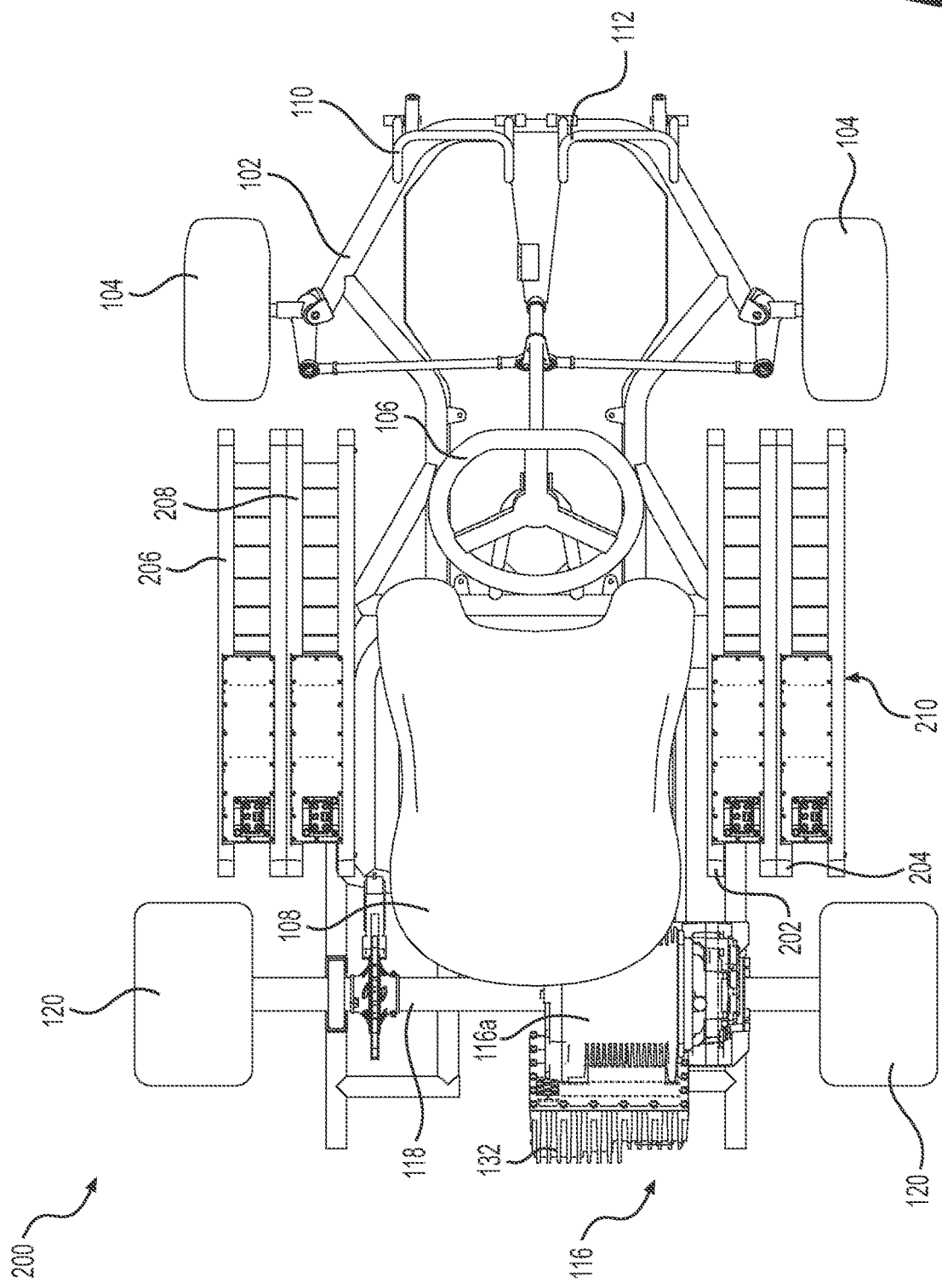
FIG. 2B is a top plan view of the electric kart of FIG. 2A.

FIGS. 1A and 1B show the general construction of an electric kart 100, according one implementation. Some implementations of the electric kart 100 could be referred to as a go-kart. It should be understood that the electric kart 100 could have a construction other than the one described below. For example, FIGS. 2A and 2B show another implementation of the electric kart 200, which is described later in this document.

Electric kart 100 has a chassis 102 composed at least in part of a tubular structure, also known as a frame 102. The frame 102 is made from a plurality of hollow cylindrical steel members and steel brackets that are welded to each other.

It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example.

It is contemplated that at least some of the members and brackets could be made of a non-metallic material, such as composite materials or plastics for example. It is also contemplated that at least some of the members and brackets could be joined to each other by means other than welding, such as by fastening and bonding for example.

It is contemplated that two or more of the members and brackets described below could be cast or otherwise formed as a single component. It is also contemplated that the frame 102 could have more or less members and brackets than illustrated in FIGS. 1A to 1C, depending on, for example, the type of materials used, the required strength and rigidity of the frame 102 and the weight of the components attached to the frame 102.

A pair of front wheels 104 is rotatably connected to the frame 102. A steering wheel 106 is operatively connected to the front wheels 104 for steering the electric kart 100. A driver's seat 108 is connected to the frame 102 rearward of the steering wheel 106. In a front portion 108 of the electric kart 100, in front of the driver seat 108, there is an accelerator pedal 110 and a brake pedal 112.

Disposed in a rear portion 114 of the frame 102, rearward of the driver seat 108, is a drive assembly 116 for driving the electric kart 100. The drive assembly 116 includes an electric motor 116a that is positioned rearward of the driver seat 108.

A rear-wheel drive shaft 118 extends through and is supported by the drive assembly 116. A pair of rear wheels 120 is operatively connected to the frame 102 and is driven by the rear-wheel drive shaft 118. The electric motor 116a is operatively connected to the rear-wheel drive shaft 118 to drive the rear wheels 120.

It is contemplated that the electric kart 100 could include a twin-engine drive system (with two drive assemblies 116 behind and to either side of the driver's seat 108). In such an implementation, two rear-wheel drive shafts 118 would be installed on both sides of the electric kart 100, in the two drive assemblies 116.

Two batteries 122, 124 supply electric power to the electric motor 116a. Each of the two batteries 122, 124 includes a battery management module 164 and a plurality of battery cells 146.

The battery management module 164 is configured to balance the voltage of the battery cells 146, control recharging of the battery cells 146, control the operating temperature of the battery cells 146, and shut down the electric kart 100 in case of battery overload, electrical disconnect, or overheat conditions. It is contemplated that the battery management module 164 could be a different battery management module 164 that could be configured to perform a different set of functions.

As best seen in FIG. 1C, the battery management module 164 includes a quick-connect electrical connector 166 that is removably electrically mated with a matching quick-connect electrical connector 168 positioned on the frame 102 of the electric kart 100.

The matching quick-connect electrical connector 168 is electrically connected to the electric motor 116a. It is contemplated that the battery management module 164 may be electrically connected to the electric motor 116a via any other suitable electrical connection.

The battery cells 146 of each of the batteries 122, 124 are rechargeable 3.6-Volt battery cells, having a generally cylindrical shape. The battery cells 146 of each of the batteries 122, 124 are electrically interconnected in a combination of electrical parallel and electrical series connections to provide that battery 122, 124 with a battery output voltage of 50.4 Volts ("V").

More particularly, as will be described in more detail below, each of the batteries 122, 124 includes seven sleeves 150a. Each of the sleeves 150a contains twenty-four battery cells 146 grouped into two groups 146f. Each of the groups 146f has twelve battery cells 146.

Each of the sleeves 150a completely surrounds the battery cells 146 that are received in that sleeve 150a, and contacts each one of the battery cells 146.

It is contemplated that one or more of the sleeves 150*a* could only partially surround the battery cells 146 received in each of the one or more sleeves 150*a*. This arrangement could, for example, provide auxiliary air passages (not shown) through each of the one or more sleeves 150*a* to cool the battery cells 146 received in the one or more sleeves 150*a*.

The battery cells 146 in each of the groups 146*f* of battery cells 146 are interconnected electrically in parallel, such that each group outputs a total of 3.6 V. The battery 122 has a total of fourteen groups 146*f* of battery cells 146. The fourteen groups 146*f* are interconnected electrically in series to output a total of 50.4 V (14×3.6 V) to the battery management module 164.

In this implementation, the series electrical interconnection of the groups 146*f* of battery cells 146 is achieved via electrically conductive metal rails ("electrical rails") 158, which are described later in this document. It is contemplated that the battery cells 146 could be electrically interconnected using any other suitable electrical connectors.

The electrical rails 158 and the electrical interconnection of the battery cells 146 in this implementation are the same as the electrical rails 158 and the electrical interconnection of the battery cells 146 of the implementation of the battery 122 shown in FIGS. 3A to 3F, and is thus omitted here.

Each of the batteries 122, 124 has a plurality of air passages 124*a* through which air passes when the electric kart 100 is in motion to cool the at least some of the battery cells 146. The air passages 124*a* are described in more detail later in this document.

It is contemplated that the battery cells 146 could be any suitable type of battery cell. It is contemplated that the battery cells 146 could be electrically interconnected in any suitable way to provide a different output voltage and amperage, for example to suit a different electric motor 116*a*.

The two batteries 122, 124 of the electric kart 100 are connected electrically in series to the electric motor 116*a*, to provide a total of 100.8 V (50.4 V×2) to the electric motor 116*a*. It is contemplated that the batteries 122, 124 could be electrically connected to the electric motor 116*a* via any other suitable electrical connection, such as a parallel or a combination series-parallel connection (not shown). Other electrical connections could be used to suit other electric motors 116*a*.

The electric motor 116*a* in this implementation of the electric kart 100 is an Alternating-Current ("AC") motor 116*a*, and more particularly a 9 kW (at 7,800 rotations per minute) permanent magnet synchronous motor (PMSM) 116*a*.

Accordingly, this implementation of the electric kart 100 includes a power inverter 132 electrically connected between the two batteries 122, 124 and the electric motor 116*a*. The power inverter 132 converts the Direct-Current ("DC") of the two batteries 122, 124 into AC. It is contemplated that the electric motor 116*a* could be a DC motor, in which case no power inverter would be required to power the DC motor from the batteries 122, 124. It is contemplated that the electric motor 116*a* could be a different size electric motor.

The driver seat 108 has a first lateral side 128 and a second lateral side 130 opposite the first lateral side 128.

Each of the batteries 122, 124 is mounted to the frame 102 on one of the first and second lateral sides 128, 130 of the driver seat 108. Battery 122 is on the first lateral side 128. Battery 124 is on the second lateral side 140. It is contemplated that each of the batteries 122, 124 could be mounted to the frame 102 partially on one of the first and second lateral sides 128, 130 of the driver seat 108.

It is contemplated that the electric kart 100 could be implemented with only one battery, or more than two batteries, instead of the two batteries shown in FIGS. 1A to 1C. It is also contemplated that in implementations in which the electric kart 100 has two or more batteries, the batteries need not be mirror images of each other and need not be of one and the same implementation.

In this implementation, each of the batteries 122, 124 is positioned parallel to a straight forward driving direction, illustrated by reference arrow 134 in FIG. 1A, of the electric kart 100, and is substantially horizontal (on a wide side 124*c* of each battery 122, 124) relative to level terrain.

It is contemplated that the batteries 122, 124 could be positioned in any other orientation (which may include, for example, tilting and pivoting of the batteries 122, 124), so long as air flows through the air passages 148 of each of the batteries 122,124 when the electric kart 100 is in motion. Air passages 148 are described later in this document.

For example, FIGS. 2A and 2B show another implementation of the electric kart 200. Electric kart 200 is the same as electric kart 100, except that it has four batteries 202, 204, 206, 208 that power its electric motor 116*a* and each of the four batteries 202, 204, 206, 208 is oriented substantially vertically on a long side 210 of each of battery 202, 204, 206, 208, relative to terrain (not shown). The electric kart 200 has two batteries 202, 204 and 206, 208 on each longitudinal side of the electric kart 200.

In an aspect, battery orientations could be selected, for example, to improve aerodynamics of a given implementation of the electric kart 100, 200, or to improve airflow through the air passages 148 of the batteries 122, 124, 202, 204, 206, 208.

It is contemplated that the batteries 122, 124 could be used with features such as air manifolds (not shown, described later in this document), so long as air flows through the air passages 148 of each of the batteries 122, 124, 202, 204, 206, 208 when the electric kart 100 is in motion.

The batteries 122, 124 are now further described with reference to FIGS. 1C to 1F. The batteries 122, 124 are mirror images of each other and have the same features. Thus, for simplicity, only the battery 122 will be described. A description of the battery 122 corresponds to a description of the battery 124.

As shown, the battery 122 has a support structure 144. The support structure 144 has a bottom portion 144*a* and a top portion 144*b* spaced from the bottom portion 144*a*. In this implementation, the battery 122 is mounted to the frame 102 of the electric kart 100 via the bottom portion 144*a* of the support structure 144.

As shown in FIG. 1C, the electric kart 100 includes a battery locking mechanism 138 operatively connected to the frame 102 of the electric kart 100. The battery 122 is mounted to the frame 102 of the electric kart 100 via the battery locking mechanism 138. The battery locking mechanism 138 is operable to lock the battery 122 to the frame 102, and to unlock the battery 122 from the frame 102.

The battery locking mechanism 138 includes two actuators 140, 142. Each of the actuators 140, 142 is movable between a locked position, in which that actuator 140, 142 compresses the battery 122 against the frame 102 of the electric kart 100 and thereby locks the battery 122 to the frame 102, and an unlocked position in which that actuator 140, 142 is disengaged from the battery 122. When both of the actuators 140, 142 are in the unlocked position, the battery 122 can be removed from the frame 102.

Each of the actuators 140, 142 includes a lever 140a, 142a that is movable between a locked position and an unlocked position. Each of the actuators 140, 142 also includes a compression block 140b, 142b that is operable by a corresponding one of the levers 140a, 142a to compress the bottom portion 144a of the support structure 144 of the battery 122 against the frame 102 of the electric kart 100 by moving the corresponding lever 140a, 142a to the locked position.

Each compression block 140b, 142b is also operable by the corresponding lever to disengage the bottom portion 144a of the support structure 144 from the frame 102 by moving the lever 140a, 142a back to its unlocked position.

It is contemplated that the battery locking mechanism 138 could have a different number of actuators 140, 142. It is contemplated that any other suitable locking mechanism could be used to mount the batteries 122, 124 to the electric kart 100. It is contemplated that the locking mechanisms could be replaced by one or more of, or a combination of fasteners, such as bolts or screws.

It is contemplated that in other implementations, the support structure 144 could be made integral with the frame 102 of the electric kart 100.

The support structure 144 of the battery 122 includes four handles 144c for carrying the battery 122 when the battery 122 is disengaged from the electric kart 100. It is contemplated that in other implementations, the battery 122 could have no handles, or a different number of handles.

As shown in FIG. 1D, the battery 122 has a plurality of battery cells 146 positioned on the support structure 144 such that there are three air passages 148 defined between the battery cells 146. Air passes through each of the three air passages 148 when the electric kart 100 is in motion, to cool some of the battery cells 146.

It is contemplated that the battery 122 could have only one air passage, two air passages, or more than the three air passages 148.

Each of the air passages 148 has two open ends 124a,b that are fluidly interconnected to allow air to pass between the open ends 124a,b. The battery 122 is positioned on the frame 102 of the electric kart 100 such that when the electric kart 100 moves straight forward, the open ends 124a of the air passages 148 face the straight forward direction and collect air such that the air passes through the open ends 124a and exits from the corresponding open ends 124b.

It is contemplated that the battery 122 could be positioned on the frame 102 of the electric kart 100 such that when the electric kart 100 moves straight forward, the open ends 124b would face the straight forward direction to collect air such that the air would pass through the open ends 124b and would exit from the corresponding open ends 124a.

The battery 122 has seven heat exchangers 150, arranged into four rows and two columns. The rear column has four heat exchangers 150 and the front column has three heat exchangers 150 and a battery management module 164. In this implementation, each of the seven heat exchangers 150 is the same, but it is contemplated that the heat exchangers 150 could differ. It is contemplated that the battery 122 could have fewer or more heat exchangers 150.

In this implementation, one of the heat exchangers 150 and the battery management module 164 are positioned on the support structure 144 of the battery 122 to define part of one of the air passages 148. Air passing in that air passage 148 cools the battery management module 164 when the electric kart 100 is in use.

As best shown in FIG. 1D, each of the heat exchangers 150 includes a sleeve 150a that extends between the bottom portion 144a and the top portion 144b of the support structure 302. The sleeves 150a are positioned on the support structure 144 such that they define the three air passages 148 therebetween.

In a further aspect, each of the heat exchangers 150 includes two pairs of racks 146a,b and 146c,d. The racks 146a, 146c are bottom racks, and the racks 146b, 146d are top racks. Each of the racks 146a to 146d is molded from plastic and defines a plurality of receptacles 146e.

Each of the receptacles 146e is sized to receive a battery cell 146 therein. For clarity of the figures, only some of the battery cells 146 have been labelled. It is contemplated that the racks 146a to 146d could be made from a material other than plastic such as a material having good heat conduction properties.

As best shown in FIG. 1E, each of the sleeves 150a has two sleeve recesses 150b. Each of the two sleeve recesses 150b is shaped to receive one of the racks 146a to 146d therein. Thus, each pair of racks 146a,b and 146c,d sandwiches a central part of a corresponding sleeve 150a and is received in the corresponding sleeve 150a.

The sleeves 150a are shaped to contact the surface of the battery cells 146 for improved heat transfer between the battery cells 146 and air passing through the air passages 148. This contact area is between the pair of racks 146a,b or 146c,d, as shown by reference numeral 150c in FIG. 1E.

Should there be any gaps between the surfaces of the battery cells 146 and the sleeves 150a resulting from manufacturing tolerances, these gaps can be filled with a filler material, such as a known heat conductive filler material to further improve heat transfer between the battery cells 146 and the air passing through the air passages 148.

The filler material is illustrated with reference numeral 150d in FIG. 1E. It is contemplated that the filler material 150d could be omitted. It is also contemplated that the battery cells 146 could be completely spaced from the sleeves 150a and the filler material 150d could be used to fill the resulting gap.

The bottom portion 144a and the top portion 144b of the support structure 144 each have a plurality of structural recesses 152. Each structural recess 152 is shaped to receive a sleeve 150a therein. In this implementation, each structural recess 152 is defined by a structural aperture 151 and a corresponding access panel 160, 162. Each structural aperture 151 extends between a sleeve-facing surface 154 of the support structure 144 and an outward-facing surface 156 of the support structure 144. The outward-facing surface 156 is opposite the sleeve-facing surface 154.

The structural apertures 152 serve as access openings to the battery cells 146 and electrical connections (which will be described later in this document) of the battery 122. To this end, the battery 122 includes two access panels 160 and 162. The bottom access panel 160 is removably attached to the bottom portion 144a of the support structure 144 via a plurality of screws (not shown). The top access panel 162 is removably attached to the top portion 144b of the support structure 144 via a plurality of screws (not shown). Each of the access panels 160, 162 is a sheet of metal. It is contemplated that any other suitable construction could be used.

It is contemplated that the support structure 144 could have no access panels. It is contemplated that the support structure 144 could have one access panel, or more than two access panels. It is contemplated that the support structure 144 could have more than one type of access panel. The structural recesses 152 would be adopted accordingly for each implementation of the support structure 144.

The support structure 144 is made of a plastic that is sufficiently strong to keep the battery 124 together when the electric kart 100 is in use. The sleeves 150a are made of aluminium. It is contemplated that various parts of the battery 122 could be made from any other suitable materials.

The shape of the recesses 152 is selected such that when one of the racks 146a to 146d is received in a recess 152, that rack 146a, b, c, or d is substantially flush with the sleeve-facing surface 154 of the support structure 144. It is contemplated that one or more of the recesses 152 could have a shape selected such that the rack 146a to 146d received in that recess 152 is above or below the sleeve-facing surface 154.

The recesses 152 all have the same shape and the sleeves 150a all have the same shape. The shape of the recesses 152 and the shape of the sleeves 150a are selected to fit one into the other, as shown in FIG. 1E. It is contemplated that the recesses 152 and the sleeves 150a could have different shapes selected to fit one into the other. It is also contemplated that the sleeves 150a and/or the recesses 152 could have any suitable known alignment feature(s) (not shown) to aid in aligning and/or retaining the sleeves 150a, the racks 146a to 146d, and the recesses 152 relative to each other.

Similar to the sleeves 150a, the battery management module 164 is received in a corresponding pair of recesses 164a and 164b in the support structure 144. The top recess 164b is defined by a structural aperture 151 and the top access panel 162. It is contemplated that the top recess 164b could be defined solely by the top portion 144b of the support structure 144.

In this implementation, the recesses 164a and 164b receiving the battery management module 164 are substantially rectangular. It is contemplated that the recesses 164a and 164b could have the same shape as the recesses that receive the sleeves. The battery management module 164 would be adapted accordingly, to fit and to be received in these recesses 164a, 164b. It is contemplated that the implementation of the battery 122 having recesses 152, 164a, 164b of one and the same shape could allow for the battery management module 164 to be receivable in any one of the recesses 152, 164a, 164b.

It is contemplated that the racks 146a to 146d need not be received in the sleeves 150a, as shown in the alternative implementation of FIG. 1F for example. In this alternative implementation, each rack 146a to 146d in each pair of the racks 146a to 146d has a groove 146e and the sleeve 150a corresponding to that pair of racks 146a to 146d is received in the groove 146e. The sleeve 150a is thus sandwiched by that pair of racks 146a to 146d.

It is contemplated that the battery 122 need not have racks 146a to 146d on both the top and the bottom of the battery cells 146. It is contemplated that the support structure 144 and the sleeves 150a could be adapted in such implementations to retain the battery cells 146 and the sleeves 150a in place when the battery 122 is in use and/or that one or more additional elements other than racks could be provided to retain the battery cells 146 and the sleeves 150a in place.

The battery 122 may be assembled using any suitable known method and any suitable combination of known connectors, such as fasteners and adhesives. For example, the top 144b and bottom 144a portions of the support structure 144 may be screwed to the sleeves 150a so as to hold the battery 122 together.

Another implementation of the battery 122 is described next.

The battery 300 is the same as the battery 122 except with respect to the implementation of the support structure 302, the racks 326, 328 and the battery management module 304. These differences will be described below.

The battery 300 has the same battery cells 146 as the battery 122. The fourteen groups of battery cells 146 are positioned in an alternating up-down configuration, as shown with "+" and "−" signs in FIG. 3D. The groups that are positioned "up" are positioned such that their positive terminals face away from the bottom portion 144a of the support structure 302.

The groups that are positioned "down" are positioned such that their positive terminals face toward the bottom portion 144a of the support structure 302. The positive terminals are shown with "+" signs on FIG. 3D. The negative terminals are shown with "−" signs on FIG. 3D.

Figure 3A:
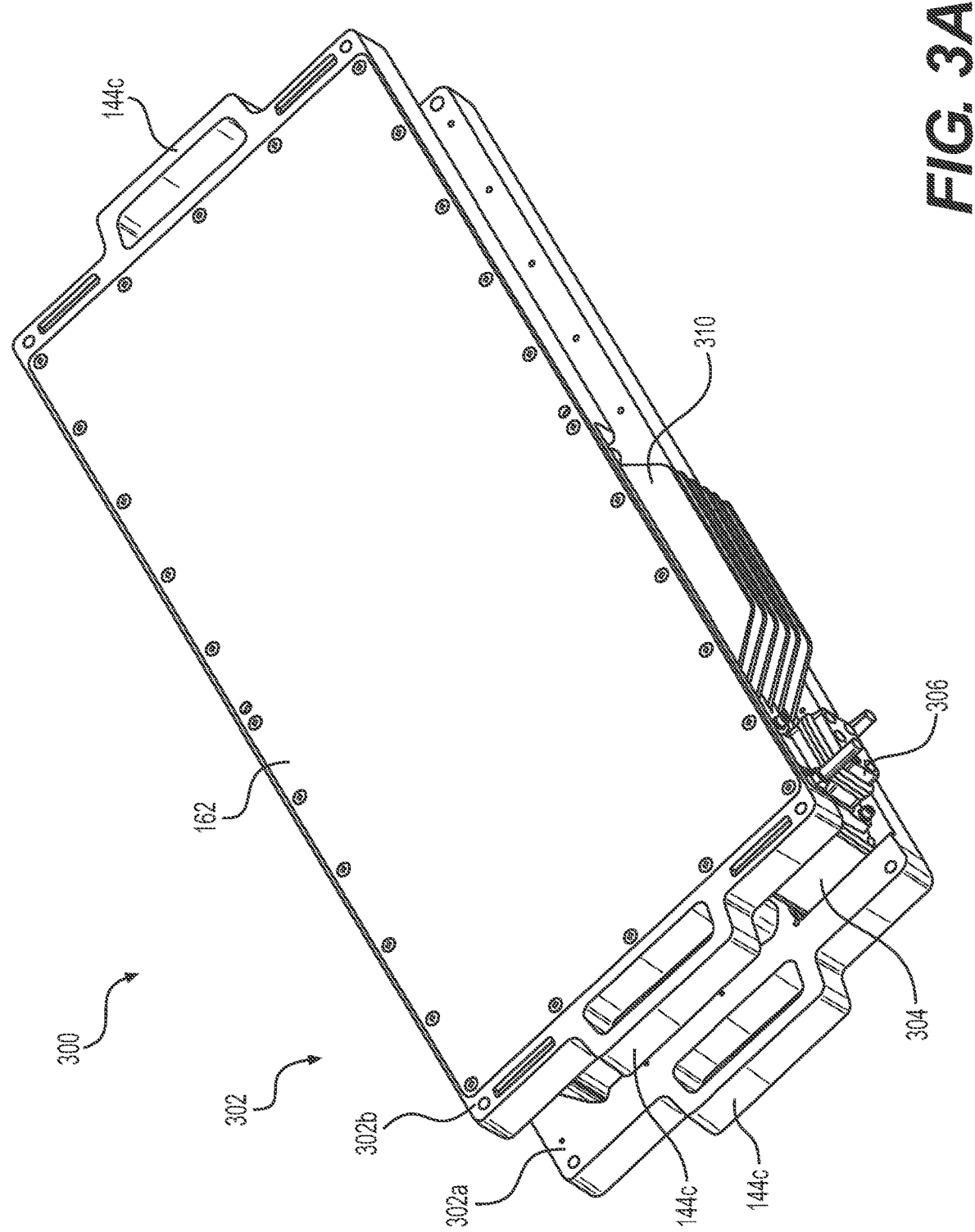
FIG. 3A is a perspective view of a battery of the electric kart of FIGS. 1A and 1B, according to another implementation of the battery.
Figure 3B:
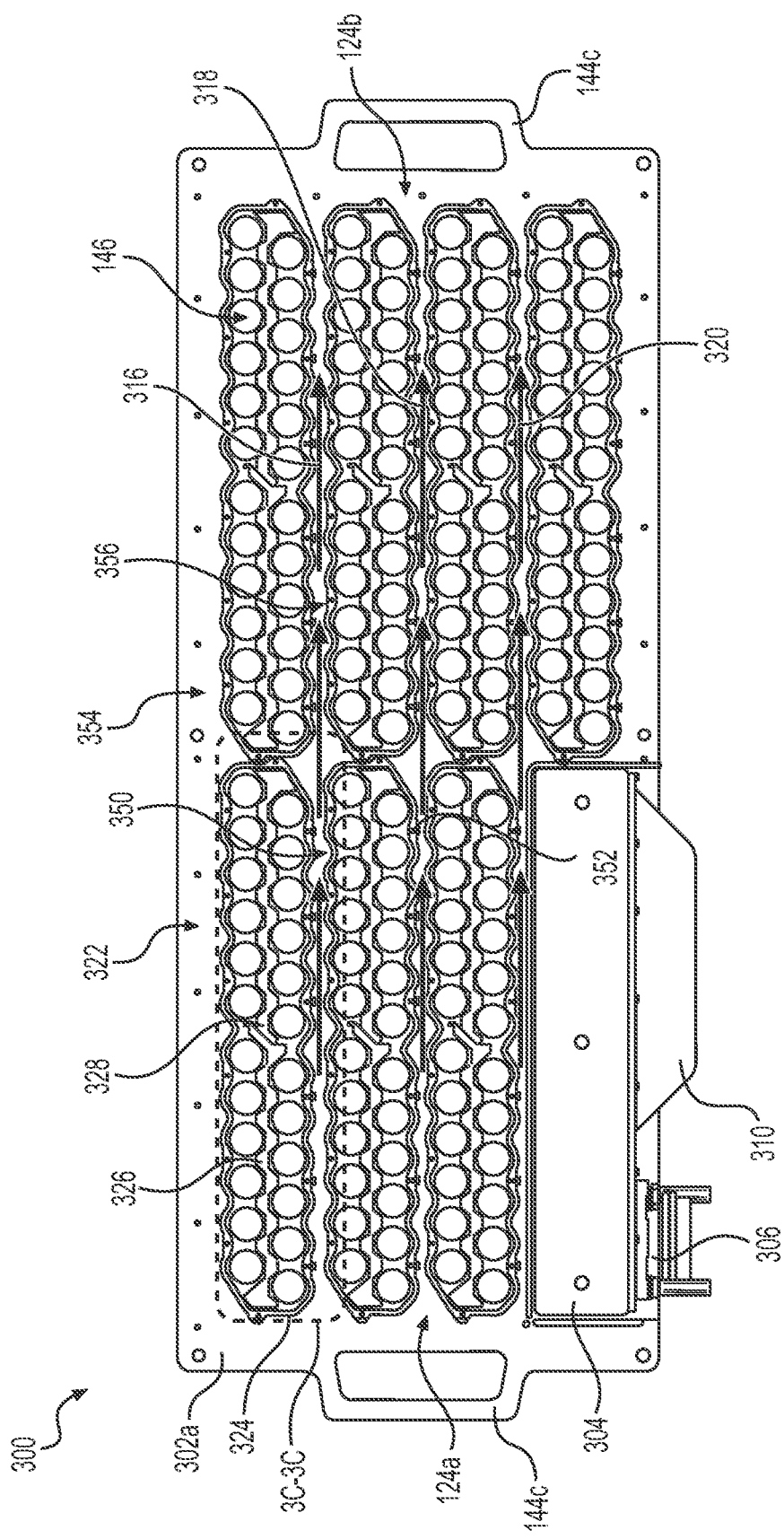
FIG. 3B is a top plan view of the battery of FIG. 3A, with the battery being partly-disassembled to better show some of its parts.
Figure 3C:
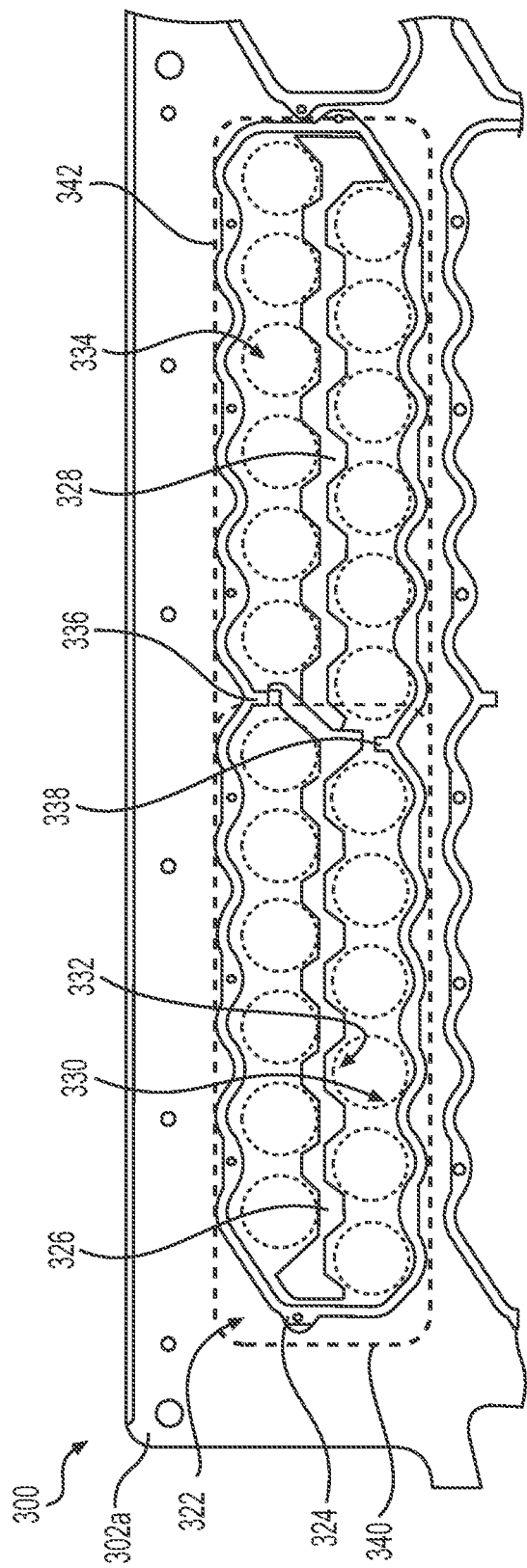
FIG. 3C is a close-up view of portion 3C-3C of the battery of FIG. 3B.
Figure 3D:
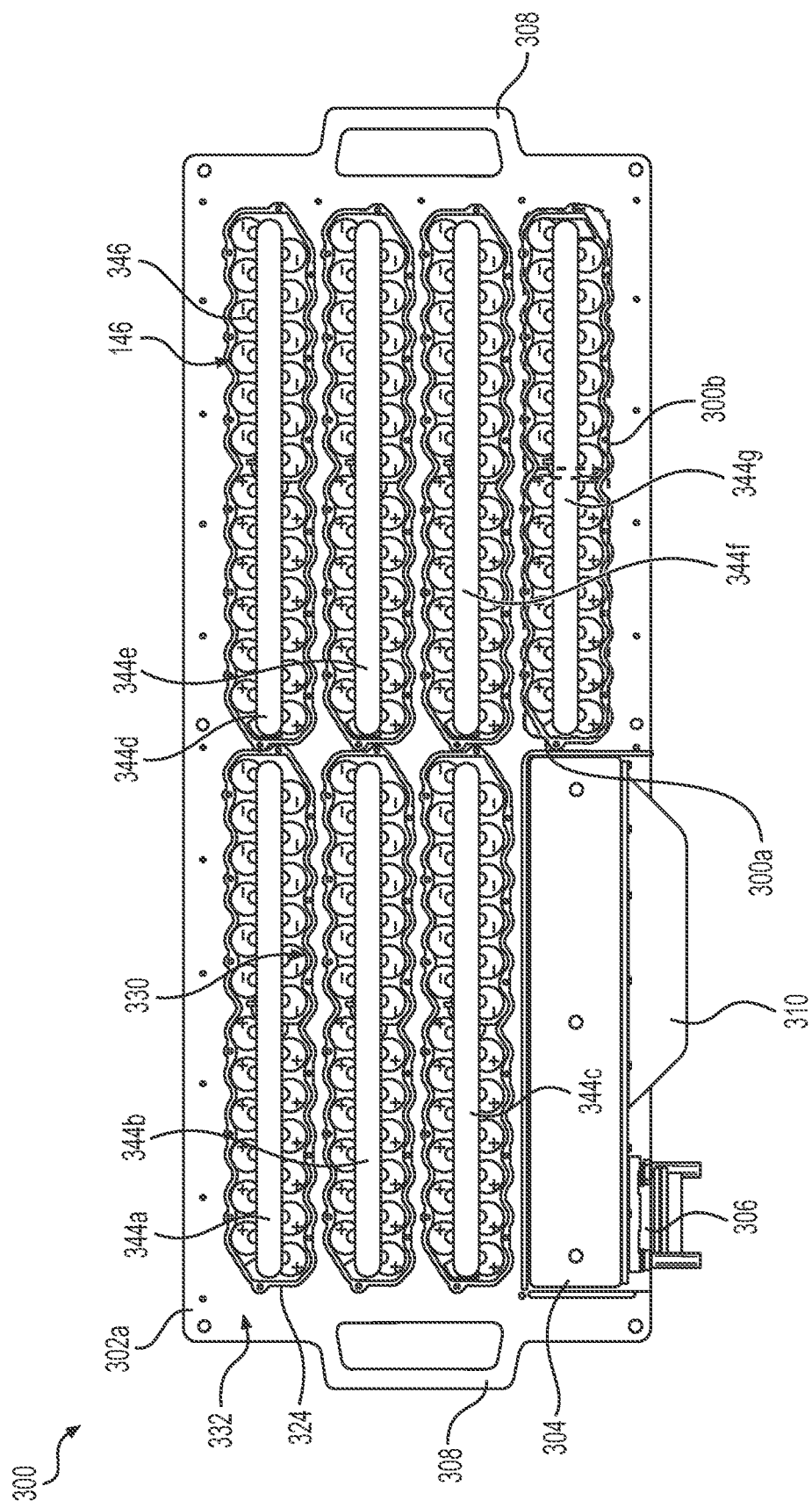
FIG. 3D is a top plan view of the battery of FIG. 3A, with the top portion of the support structure of the battery being removed to better show the top-side electrical rails of the battery.
Figure 3E:
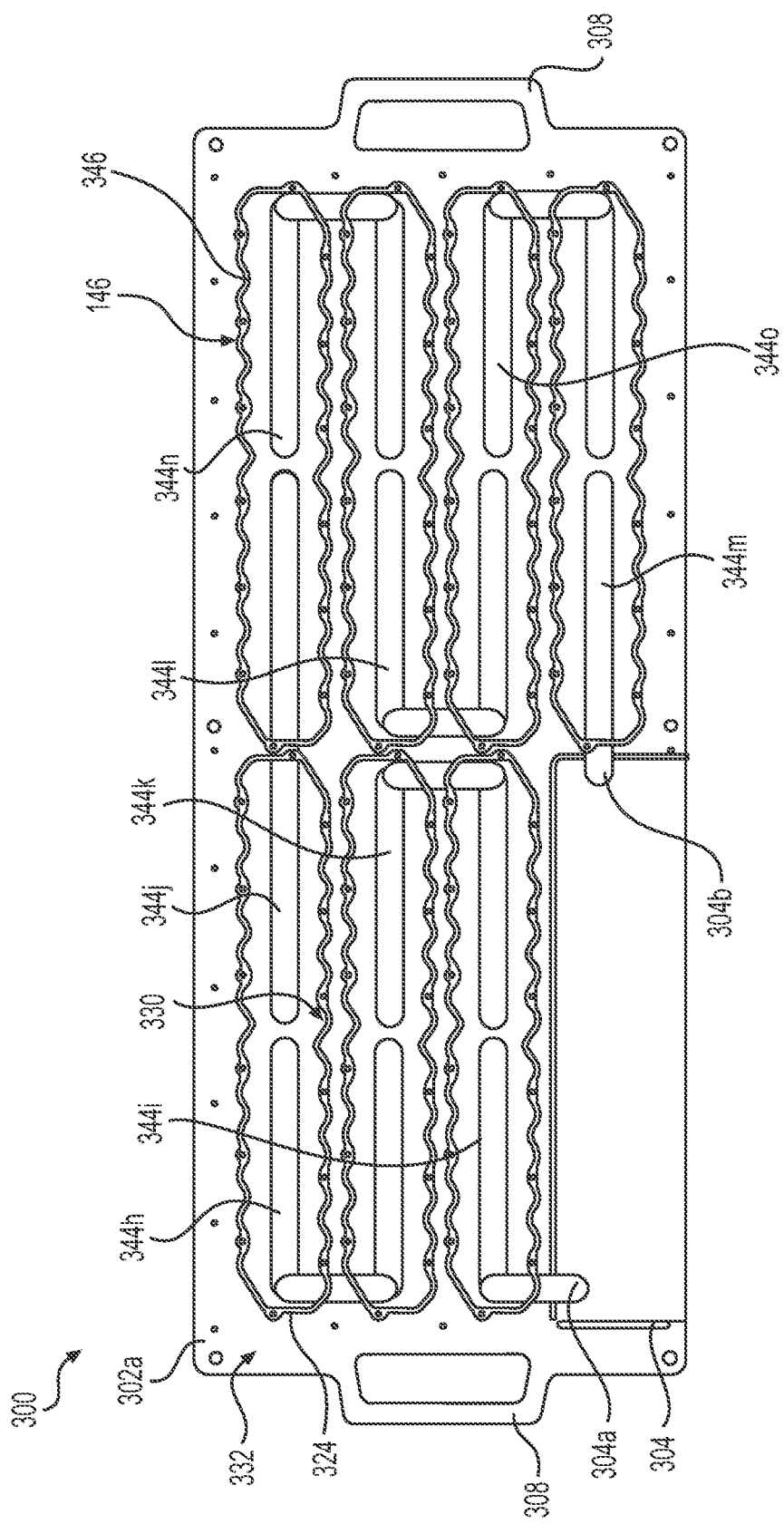
FIG. 3E is a top plan view of the battery of FIG. 3A, with the top portion of the support structure, the top-side electrical rails, the battery management module, the battery cells, and the racks of the battery being removed to better show the bottom-side electrical rails of the battery.
Figure 3F:
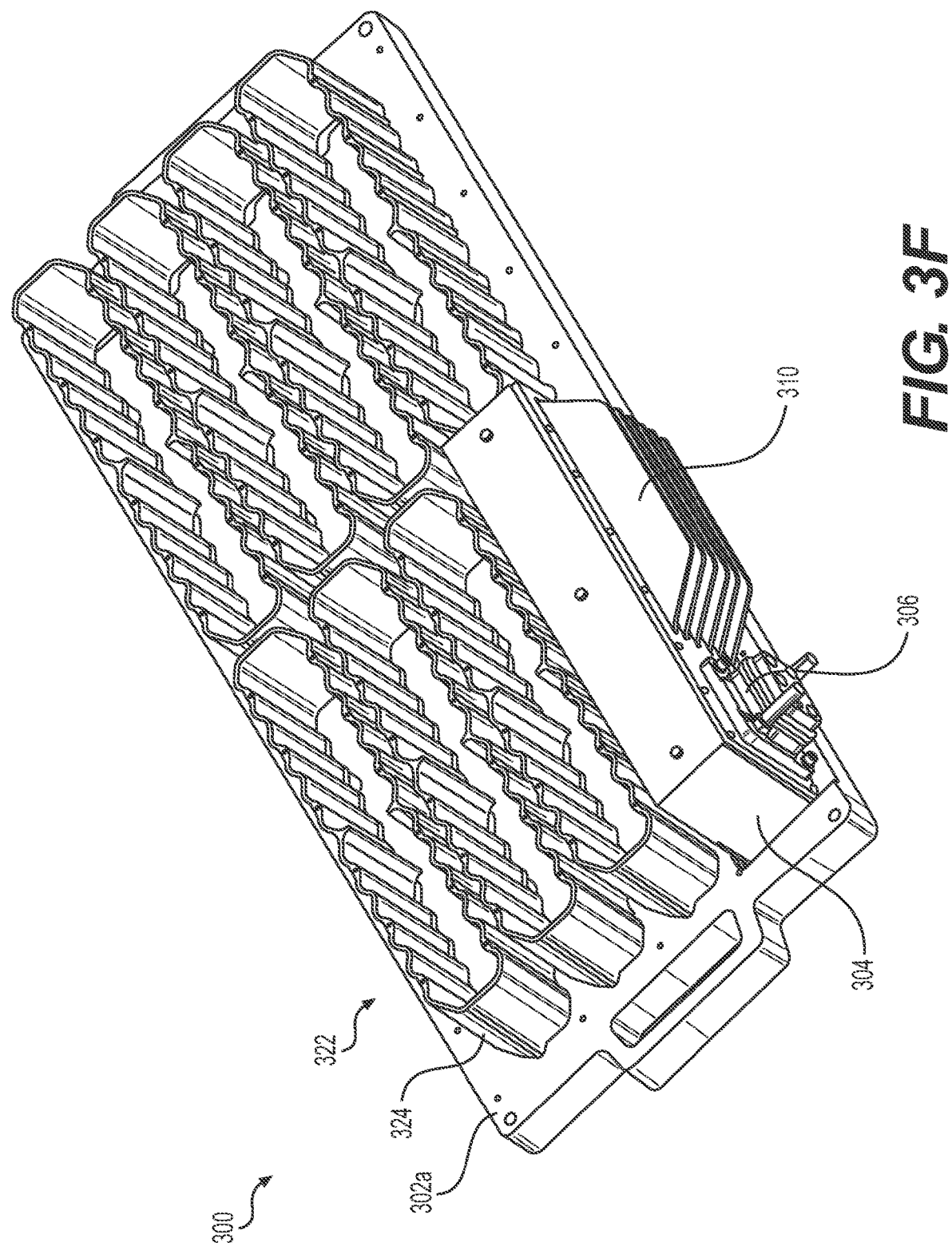
FIG. 3F is a perspective view of the battery of FIG. 3A, with the battery being partly-disassembled to better show some of its parts.

Further as shown on FIGS. 3D and 3E, the battery 300 includes electrical rails 344a to 344o, which have a different appearance but are electrically the same as the electrical rails 158 of the battery 122. As shown in FIG. 3D, electrical rails 344a to 344g are positioned on the top portion 144b side of the support structure 302. As shown in FIG. 3E, electrical rails 344h to 344o are positioned on the bottom portion 144a side of the support structure 302.

The electrical rails 344a to 344o are made of metal and electrically connect the fourteen groups of battery cells 146 in series to provide the overall battery output voltage (50.4-V). It is contemplated that the electrical rails 158, 344a to 344o could be made from any suitable electrically conductive material, or combination of materials. It is contemplated that the electrical rails 158, 344a to 344o could be substituted with any other suitable electrical connectors (for example, electrical wires).

The positive and negative terminals of each of the battery cells 146 are electrically connected to a respective one of the electrical rails 344a to 344o via tabs 346. To maintain clarity, only one of the tabs 346 is labelled in FIGS. 3D and 3E. The tabs 346 are strips of metal.

Each of the tabs 346 is soldered to a corresponding terminal of one of the battery cells 146 and to a corresponding one of the electrical rails 344a to 344o. It is contemplated that the battery cells 146 could be electrically connected to the electrical rails 344a to 344o via any other suitable electrical connector.

The electrical rails 344a to 344o are positioned as shown in FIGS. 3D and 3E such that the fourteen groups of battery cells 146 are electrically interconnected in series to result in the 50.4-V output of the battery 300.

The electrical rails 344a to 344o could be positioned differently depending on each particular battery cell arrangement and each particular desired overall battery output voltage. To this end, the battery cells 146 could be arranged in any suitable arrangement. The overall battery voltage requirement may be dictated by, for example, the type of motor(s) or other electrical devices that the battery 300 may be designed to power.

Like the battery 122, the battery 300 also includes a battery management module 304. The battery management module 304 is mounted to the support structure 302. The electrical rails 344a to 344o connect the fourteen groups of battery cells 146 (two of which groups are shown with reference numerals 300a, 300b on FIG. 3D) electrically in series to the battery management module 304 to provide the battery output voltage (in this case, the 50.4-V) to the battery management module 304.

The battery management module 304 includes a plurality of heat transfer fins 310 configured to cool the battery management module 304 when the electric kart 100 is in use. It is contemplated that other suitable battery management modules 304 could have different heat transfer fins 310, or could have no heat transfer fins 310.

A difference of the battery 300 from the battery 122 is described next. Each of the sleeves 324 of the battery 300 includes two racks 326, 328. The racks 326, 328 are molded plastic inserts that are shaped to retain the battery cells 146 in place when the battery 300 is in use. In an aspect, the racks 326, 328 are shaped to reduce clearances between the battery cells 146 and the sleeves 324 so as to reduce the magnitudes of vibrations of the battery cells 146 when the battery 300 is in use. It is contemplated that the racks 326, 328 could be any other suitable components designed to carry out the functions these racks 324, 326.

Only one set of racks 326, 328 has been labeled in the Figures, to maintain clarity of the Figures. While each sleeve 324 in this implementation has two racks 326, 328, it is contemplated that one or more of the sleeves 324 could have no racks, one rack, or more than two racks. It is also contemplated that the rack(s) 326, 328 could have shapes other than the shapes shown in the Figures.

As better seen in FIG. 3C, each sleeve 324 includes recesses 330, and each of the recesses 330 has a battery cell 146 received therein. Likewise, each of the racks 326, 328 includes corresponding recesses 332. In combination, the racks 326, 328 and the sleeve 324 provide receptacles 334 in which the battery cells 146 are received. For clarity, only some of the battery cells 146, recesses 330, and receptacles 334, have been labeled.

The battery cells 146 are slidably received in the receptacles 334. It is contemplated that the battery cells 146 could be mounted to the sleeves 324. It is contemplated that the battery cells 146 could be mounted to the racks 326, 328. It is contemplated that the battery cells 146 could be mounted to the racks 326, 328 and the sleeves 324.

In the battery 300, each of the battery cells 146 is mounted to a respective one of the racks 326, 328 via a suitable known mechanism, such as tie straps or an adhesive (not shown). Thus, the battery cells 146 could be put into and taken out from a sleeve 324 all at the same time by inserting the rack 326, 328 into and removing the rack from a sleeve 324 while the corresponding battery cells 146 are mounted thereto.

It is contemplated that one or more of the sleeves 324 could have different configurations. In this implementation, each receptacle 334 contains one of the battery cells 146. That is, each sleeve 324 contains one layer of battery cells 146.

It is contemplated that one or more receptacles 334 could contain two or more battery cells 146. That is, it is contemplated that one or more of the sleeves 324 could contain two or more layers of battery cells 146. The battery cells 146 could be stacked one on top of another.

As best shown in FIG. 3C, each of the sleeves 324 has inwardly facing protrusions 336, 338. The protrusions 336, 338 are shaped and positioned in the sleeve 324 to divide the battery cells 146 inside that sleeve 324 into two sets of battery cells 146, to reduce movement of the battery cells 146 when the electric kart 100 is in use. The two sets of battery cells 146 are shown with reference outlines 340 and 342.

This implementation of the battery 300 is assembled by pressing the bottom side of the sleeves 324 into the bottom portion 302a of the support structure 302, engaging the battery cells 146 with the racks 326, 328, then inserting the racks 326, 328 and the battery cells 146 into the sleeves 324, electrically interconnecting the battery cells 146 as described above, and pressing the top portion 302b of the support structure 144 onto the top side of the sleeves 324.

The top portion 302b and the bottom portion 302a of the support structure 302 thereby sandwich the sleeves 324, the electrical rails 344a to 344d, the battery cells 146, and the battery management module 304, and thereby hold the battery 300 together.

That is, deformation of the plastic support structure 302 holds the sleeves 324 attached to and partially inserted into each of the bottom 30a and top 302b portions of the support structure 302, and thereby holds the battery 300 together.

It is contemplated that an adhesive, or any other suitable additional structural elements, such as links and rods, could be used to strengthen the assembly of the battery 300. It is contemplated that other manufacturing and assembly methods and other hardware and materials could be used to manufacture and assemble the battery 300.

It is contemplated that in addition to, or as an alternative to, the deformation of the support structure 302 holding the battery 300 together, there could be additional members implemented to hold the top portion 302b to the bottom portion 302a together. It is contemplated that the sleeves 324 could be made integral with one or both portions 302a, 302b of the support structure 302.

It is contemplated that the top portion 302b and the bottom portion 302a could be made integral to each other—in this implementation, suitable access openings would be provided to allow for the insertion and the removal of the battery cells 146. For example, the structural apertures 152 could be adopted for this purpose.

Figure 4A:
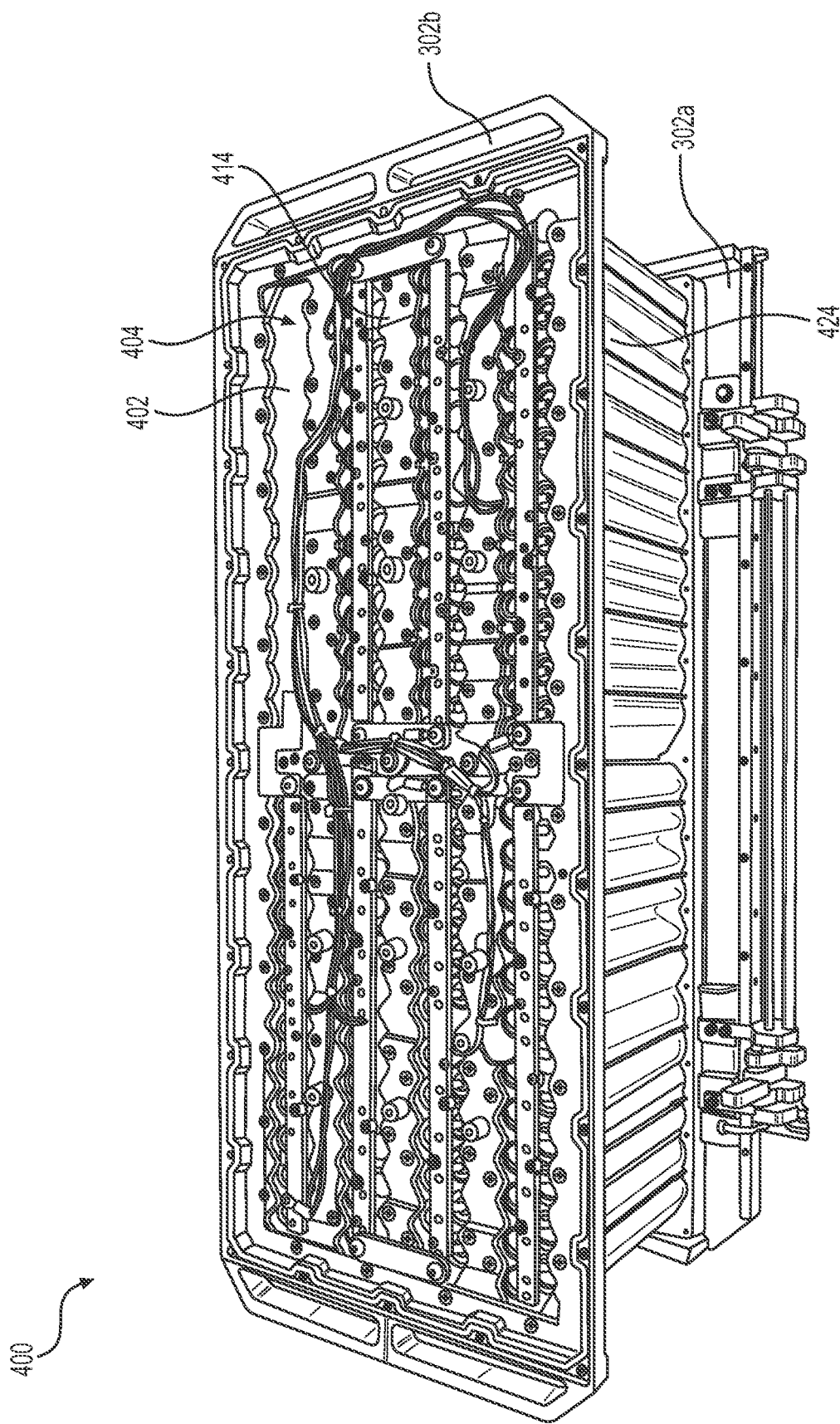
FIG. 4A is a perspective view of a battery, according to another implementation, with the top-side access panel of the battery being removed to better show the internal structure of this implementation of the battery.
Figure 4B:
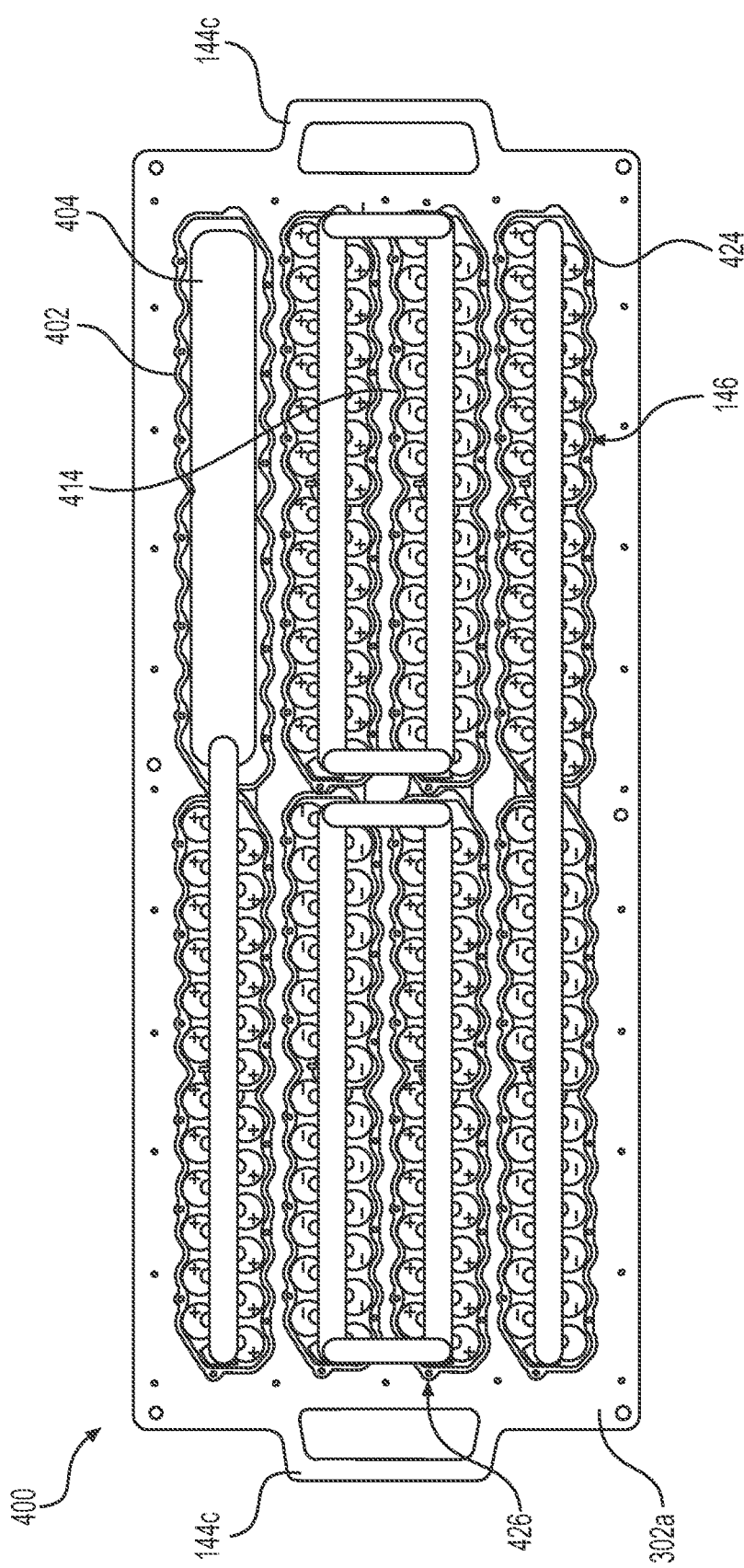
FIG. 4B is a top plan view of the battery of FIG. 4A, with the top portion of the support structure of the battery being removed to better show the top-side electrical rails of the battery.

Another implementation of battery 300 is described next, with reference to FIGS. 4A to 4C.

The battery 400 is the same as the battery 300, except insofar as it is described next. The battery 400 has an additional sleeve 402 that is positioned in place of the battery management module 304 of the battery 300. The battery management module 404 of the battery 400 is sized and received inside the additional sleeve 402.

The additional sleeve 402 defines an air passage (not shown, because it is the same as the other air passages described above) between the additional sleeve 402 and another one of the sleeves 424. In this implementation, sleeves 424 are aluminium, and the additional sleeve 402 is plastic. It is contemplated that sleeves 424 and the additional sleeve 402 could be made using any suitable material, or combination of materials.

Each of the sleeves 424 has two layers of battery cells 146 received therein. The battery cells 146 are arranged as shown with "+" and "−" signs in FIG. 4B. The battery cells 146 in each layer of battery cells 146 within each of the sleeves 424 are interconnected electrically in parallel via the electrical rails 426. The two layers of battery cells 146 in each of the sleeves 424 are interconnected in series by stacking the top layer of the battery cells 146 (this layer is seen in FIG. 4B) on top of the bottom layer of battery cells 146.

Thus, there are seven groups of battery cells 146, each block outputting 7.2-V (2×3.6-V). The seven groups of battery cells 146 are interconnected in series via the layout of the electrical rails 426 shown in FIGS. 4B and 4C, such that the battery outputs 50.4-V (7×7.2-V) to the battery management module 404.

Figure 4C:
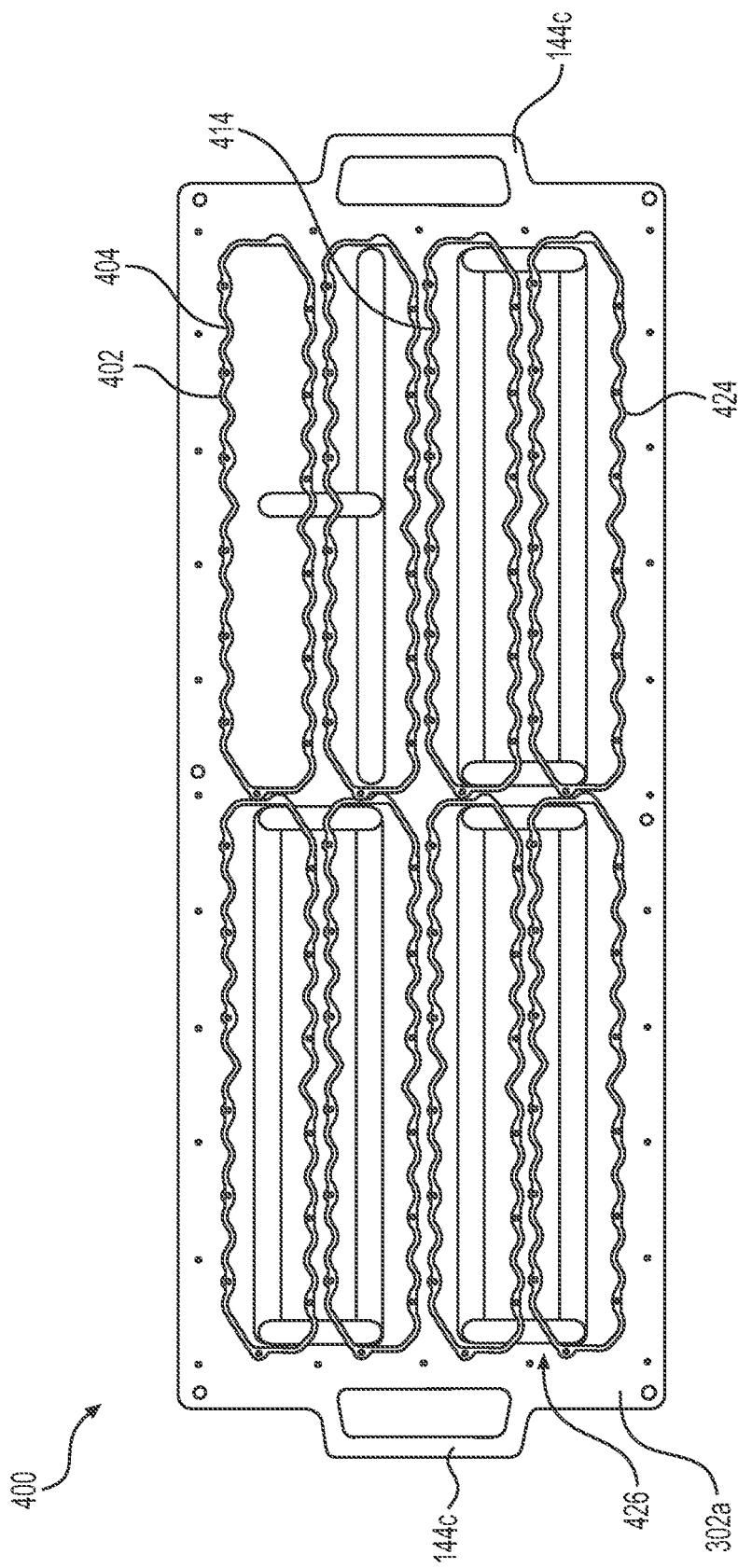
FIG. 4C is a top plan view of the battery of FIG. 4A, with the top portion of the support structure, the top-side electrical rails, the battery management module, the battery cells, and the racks of the battery being removed to better show the bottom-side electrical rails of the battery.

The electrical rails 426 shown in dashed lines on FIG. 4C are the electrical rails 426 that are positioned on the bottom side of the battery cells 146, between the battery cells 146 and the bottom portion 302a of the support structure 302.

Figure 5:
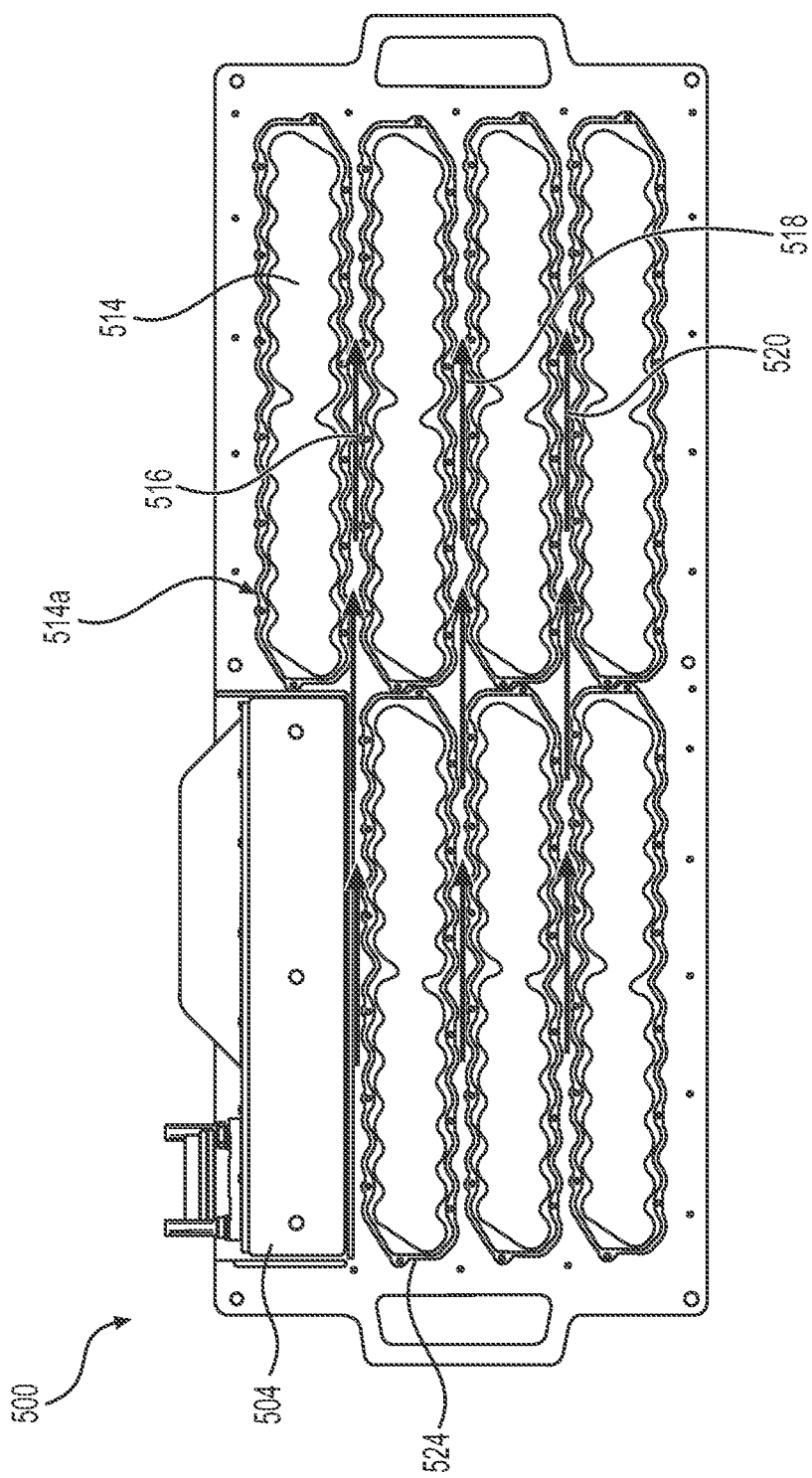
FIG. 5 is a top plan view of the left-side battery of the electric kart of FIGS. 1A and 1B, according to another implementation of the battery, with the battery being partly-disassembled to better show some of its parts.

Another implementation of battery 300 is described next, with reference to FIG. 5.

Battery 500 is the same as battery 300, except insofar as it is described next. The battery management module 504 is positioned on a different side of the battery 500. It is contemplated that the battery management module 504 could be positioned in any suitable position on the battery 500, and also does not need to be a part of the battery 500.

Each of the sleeves 524 of battery 500 has a single battery cell 514 received therein. Each battery cell 514 in this implementation is one and the same implementation of battery cell, and thus only one of the battery cells 514 is labeled.

Each of the battery cells 514 is shaped to contact the sleeve 524 in which that battery cell 514 is received to help transfer heat from that battery cell 514 to that sleeve 524 and into air that will pass, when the electric kart 100 is in use, through one or more air passages 516, 518, 520 that is defined by that sleeve 524. The battery 500 has no racks.

Figure 6:
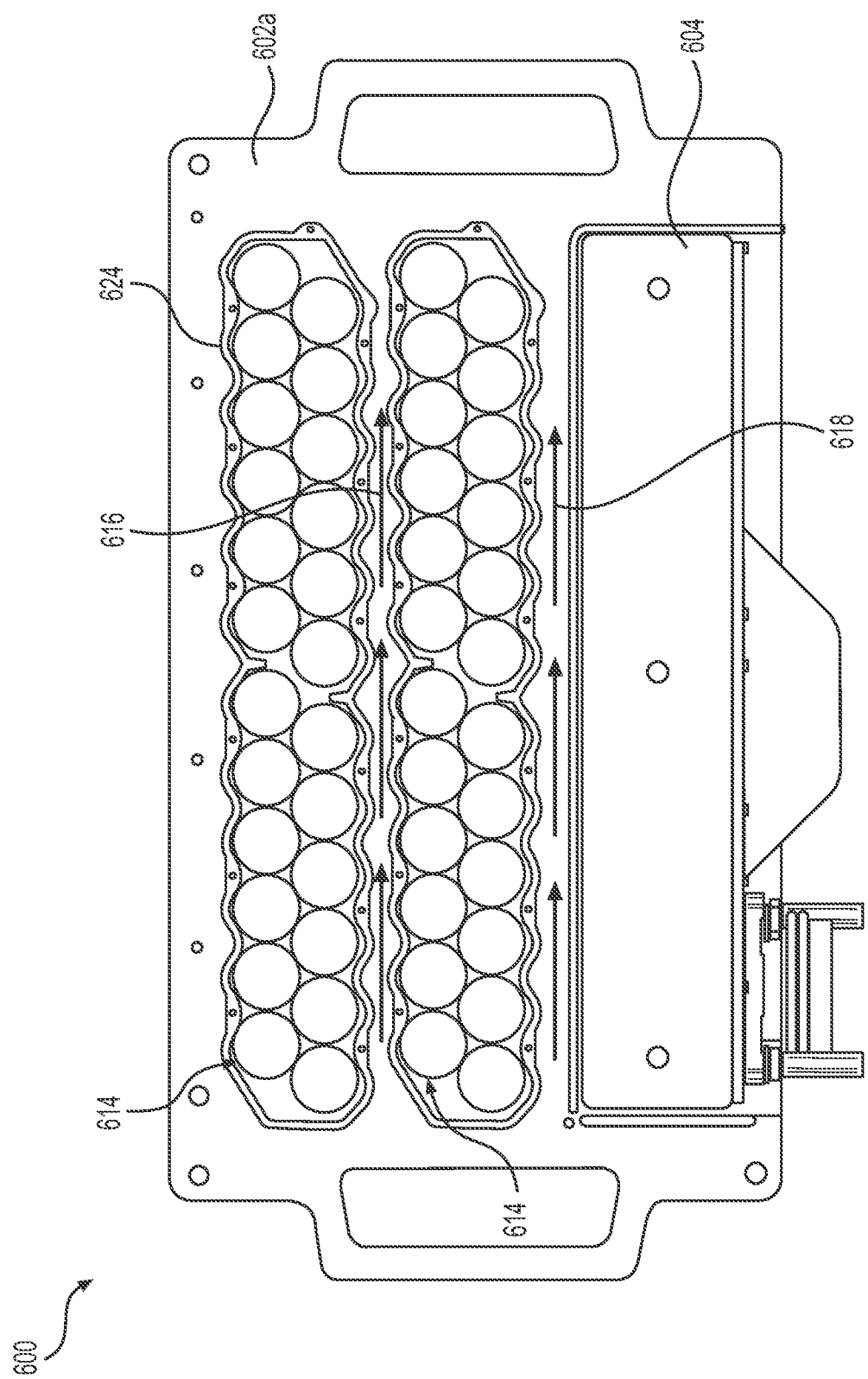
FIG. 6 is a top plan view of a battery, according another implementation, with the battery being partly-disassembled to better show some of its parts.

Another implementation of battery 300 is described with reference to FIG. 6.

Battery 600 is the same as battery 300, except insofar as it is described next. The battery 600 has two sleeves 624 positioned on the support structure 602a of the battery 600 to define air passage 616 therebetween. When the battery 600 is in use, air passes through air passage 616 to cool the battery cells 614. The battery 600 has no racks.

The battery management module 604 of this battery 600 is positioned on the support structure 602 to define air passage 618 between the battery management module 604 and one of the two sleeves 624. When the battery 600 is in use, air passes through air passage 618 to cool some of the battery cells 614 and the battery management module 604.

The battery management module 604 is the same as battery management module 304, except that it is selected (in terms of size and functionality) to serve the different number of battery cells 614 of battery 600. The support structure 602 of this battery 600 is likewise adapted to receive the two sleeves 624 and the battery management module 604, instead of the seven sleeves 324 and the battery management module 304 of battery 122.

Each of the two sleeves 624 of this battery 600 is shaped such that the battery cells 614 in that sleeve 624 are positioned in two rows of battery cells. The two rows are staggered such that each of the battery cells 614 in the two rows contacts two other battery cells 614. It is contemplated that the sleeves 624 could be shaped to receive one row, or more than two rows, of battery cells 614.

It is contemplated that the sleeves 624 could be shaped such that the battery cells 614 in the one or more rows of battery cells 614 would contact only one other battery cell 614, or more than two other battery cells 614, in the one or more rows of battery cells 614. It is also contemplated that the sleeves 624 need not be shaped to receive the same number of battery cells 614, or a single type of battery cells 614.

Figure 7:
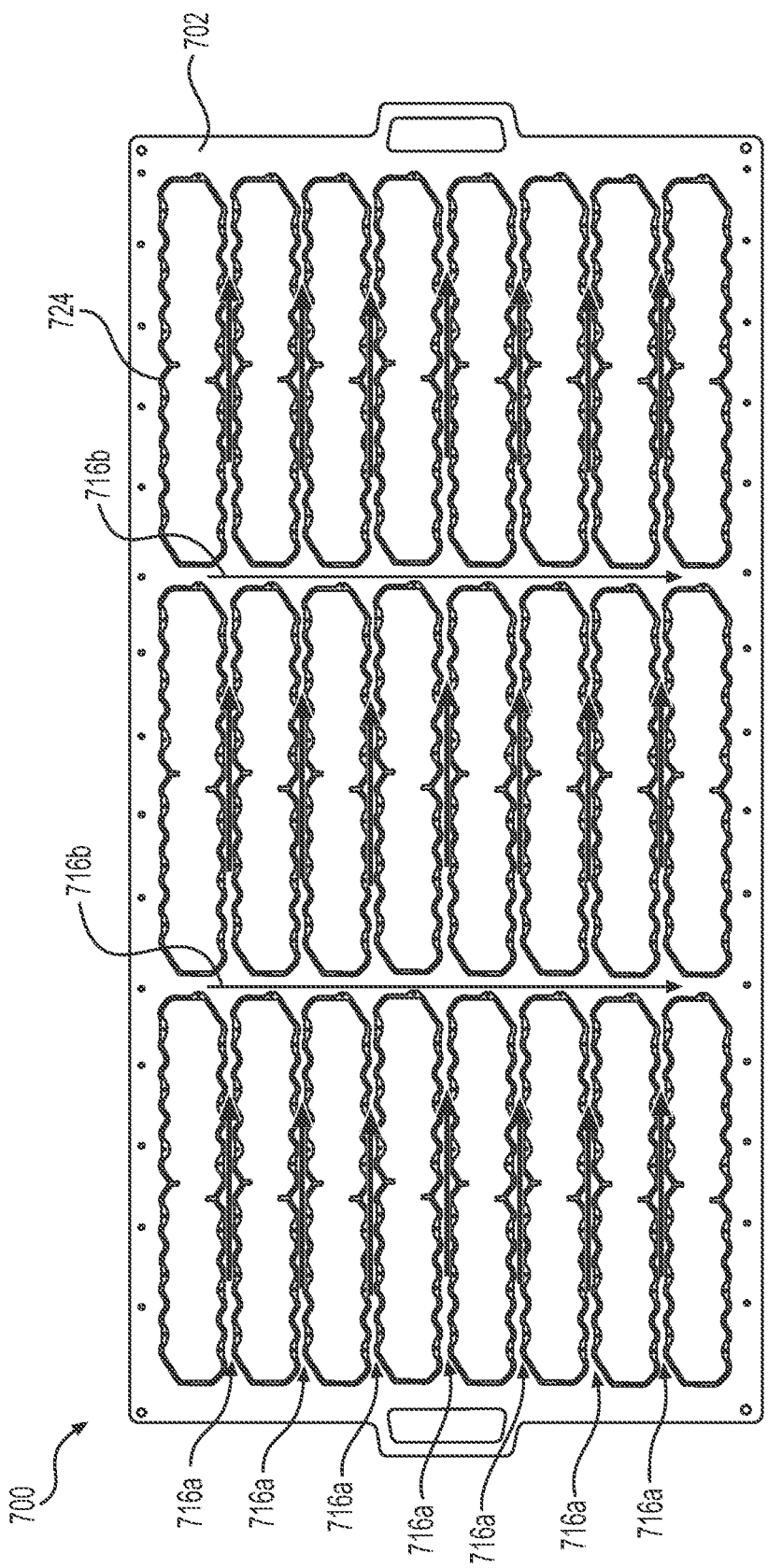
FIG. 7 is a top plan view of a battery, according to another implementation, with the battery being partly-disassembled to better show some of its parts.

Another implementation of battery 300 is described with reference to FIG. 7.

Battery 700 is the same as battery 300, except insofar as it is described next. Battery 700 has twenty-four sleeves 724 positioned on the support structure 702 of the battery 700 to define a plurality of air passages 716a, 716b therebetween. The sleeves 724 define both longitudinal air passages 716a and transverse air passages 716b.

When the electric kart 100 is in use, air passes through the plurality of air passages 716 to cool the battery cells (not shown) disposed in the sleeves 724 of the battery 700. The battery cells of this implementation have not been shown. The sleeves 724 could be adapted to receive more than one type of battery cells, and the battery cells could be electrically interconnected using any suitable electrical interconnection to provide a desired overall battery output voltage.

It is contemplated that any suitable electrical output (not shown) could be used. For example, the electrical connection could be a combination of wires, or any suitable electrical connector (not shown).

When an electric kart 100, 200 is implemented with the battery 700, one or more suitable battery management modules, if required, could be positioned on the electric kart 100, 200 (for example, could be mounted to the frame 102 of the electric kart 100, 200), and could be electrically connected to the battery 700 to power the electric kart 100, 200.

Additional contemplated aspects (not shown) of the battery 122 are described next.

It is contemplated that in some implementations, one or more heat exchangers of the battery could include a plurality of heat transfer fins (not shown) configured to transfer heat away from the battery cells when the battery is in use.

It is also contemplated that in some implementations, the battery could also include a housing that could cover the battery cells of that battery. The geometry and materials of the housing could be selected to protect the battery cells from, for example, mechanical impact and weather elements when the battery is in use.

The housing could have an air inlet, an air outlet, and a ventilated space extending between the air inlet and the air outlet. The battery cells could be positioned in the ventilated space, such that the air passage(s) could pass at least some of the air that would pass through the ventilated space when the battery is in use.

It is contemplated that in implementations in which the battery includes a housing and is implemented with an electric kart, the housing could have an air manifold fluidly connected to the air inlet of the housing. The air manifold could be sized and positioned relative to the electric kart to increase airflow through the ventilated space of the housing when the electric kart is in motion, relative to airflow that could occur through that ventilated space if no air manifold was present.

It is also contemplated that in some implementations, the heat exchangers could be the racks, similar to the racks described above. The battery cells could be mounted to the racks, and (due to the lack of sleeves) could thus be exposed to air. In such implementations, the battery cells and the rack(s) define the air passage(s) of the battery. It is contemplated that the rack(s) could be integrally made. That is, the rack(s) could be a single rack comprising receptacles or other features to allow the battery cells to be received therein or to be mounted thereto, as may be applicable to each implementation of the battery.

It is contemplated that the battery could be used in applications other than electric kart applications. It is contemplated the battery could be adapted (for example, in terms of sizes, materials, capacities, etc.) to suit each application, or applications, for which the battery may be designed.

It is contemplated that the battery could have any other number of sleeves, more than one type of sleeves, and any number of battery cells, to suit each particular application of the battery.

In each implementation of the battery, the components of the battery and their characteristics, such as the geometry and sizing of the air passage(s) of the battery, could be selected to suit each particular application of the battery.

For example, the geometry and sizing of the air passage(s) of the battery could be selected at least in part based on a desired range of operating temperatures of the battery cells, on expected heat generation rates of the battery cells, and on airflow rates and air temperatures expected to occur in the air passage(s) of the battery when the battery is in use. Suitable materials for the components of the battery could be selected based on similar considerations.

It is contemplated that the parts of the battery could be configured to be assembled in other ways than the configurations described in this document, and could be made from other suitable materials than the materials described in this document.

More generally, the batteries described in this document could be manufactured and implemented using any suitable materials, components, and engineering design, selection, manufacturing, assembly, wiring, and programming methods. Likewise, the electric kart described in this document could be manufactured and implemented using any suitable materials, components, and design, selection, manufacturing, assembly, wiring, and programming methods.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. An electric kart, comprising:
a frame;
a driver seat mounted to the frame;
two front wheels and two rear wheels operatively connected to the frame;
an electric motor operatively connected to the two rear wheels to drive the two rear wheels; and
at least one battery operatively connected to the electric motor to power the electric motor to drive the electric kart, the at least one battery having:
a support structure mounted to the frame of the electric kart, the support structure including a bottom portion mounted to the frame of the electric kart and a top portion spaced from the bottom portion;
a first heat exchanger and a second heat exchanger positioned on the support structure, the first heat exchanger and the second heat exchanger defining an air passage therebetween,
the first heat exchanger including a first sleeve that extends between the bottom and top portions of the support structure,
the second heat exchanger including a second sleeve that extends between the bottom and top portions of the support structure; and
a first plurality of battery cells disposed inside the first heat exchanger and a second plurality of battery cells disposed inside the second heat exchanger, the first plurality of battery cells being received in the first sleeve, the second plurality of battery cells being received in the second sleeve, the first plurality of battery cells and the second plurality of battery cells being positioned on the support structure such that the air passage is defined between the first plurality of battery cells and the second plurality of battery cells, the air passage being configured such that motion of the electric kart induces airflow through the air passage to cool at least some battery cells of at least one of the first and second pluralities of battery cells.

2. The electric kart of claim 1, wherein:
the air passage has a first open end and a second open end fluidly connected to the first open end; and
the air passage is positioned such that when the electric kart is in a straight forward motion, air passes in the air passage from the first open end to the second open end.

3. The electric kart of claim 1, wherein:
the first heat exchanger includes a first rack disposed inside the first sleeve;
the second heat exchanger includes a second rack disposed inside the second sleeve;
at least some battery cells of the first plurality of battery cells are mounted to the first rack; and
at least some battery cells of the second plurality of battery cells are mounted to the second rack.

4. The electric kart of claim 3, wherein:
the first sleeve has a first plurality of recesses, each recess of the first plurality of recesses having a battery cell of the first plurality of battery cells received therein; and
the second sleeve has a second plurality of recesses, each recess of the second plurality of recesses having a battery cell of the second plurality of battery cells received therein.

5. The electric kart of claim 1, wherein:
the first heat exchanger includes a first rack disposed inside the first sleeve;
the first sleeve has a first plurality of recesses;
the first rack and the first plurality of recesses define a first plurality of receptacles;
the first plurality of battery cells is received in the first plurality of recesses;
the second heat exchanger includes a second rack disposed inside the second sleeve;
the second sleeve has a second plurality of recesses;
the second rack and the second plurality of recesses define a second plurality of receptacles; and
the second plurality of battery cells is received in the second plurality of recesses.

6. The electric kart of claim 1, wherein:
each battery cell of the first plurality of battery cells contacts the first sleeve and at least one other battery cell of the first plurality of battery cells; and
each battery cell of the second plurality of battery cells contacts the second sleeve and at least one other battery cell of the second plurality of battery cells.

7. The electric kart of claim 1, wherein:
the first heat exchanger includes a first rack and a second rack;
the first sleeve is positioned between the first rack and the second rack;
the second heat exchanger includes a third rack and a fourth rack; and
the second sleeve is positioned between the third rack and the fourth rack.

8. The electric kart of claim 7, wherein:
each of the first and second racks includes a plurality of receptacles;
each of the receptacles of the first and second racks has one battery cell of the first plurality of battery cells received therein;
each of the third and fourth racks includes a plurality of receptacles; and each of the receptacles of the third and fourth racks has one battery cell of the second plurality of battery cells received therein.

9. The electric kart of claim 1, wherein:
the first plurality of battery cells is arranged into at least two rows of battery cells; and
the second plurality of battery cells is arranged into at least two rows of battery cells.

10. The electric kart of claim 1, wherein:
the air passage is a first air passage defined by the first and second sleeves; and
the at least one battery includes:
 a third heat exchanger having a third sleeve that extends between the bottom and top portions of the support structure, the third sleeve and at least one of the first and second sleeves defining a second air passage therebetween, and
 a third plurality of battery cells received in the third sleeve.

11. The electric kart of claim 1, wherein the at least one battery includes a battery management module electrically connected to at least some battery cells of the first and second pluralities of battery cells.

12. The electric kart of claim 1, wherein:
the at least one battery includes a first battery and a second battery;
the first battery is mounted to the frame of the electric kart at least partially on one side of the driver seat; and
the second battery is mounted to the frame of the electric kart at least partially on another side of the driver seat.

13. A battery, comprising:
a support structure;
a plurality of battery cells positioned on the support structure such that there is an air passage defined between the battery cells; and
a plurality of heat exchangers positioned on the support structure to define the air passage between at least two heat exchangers of the plurality of heat exchangers,
each heat exchanger of the plurality of heat exchangers including a sleeve, the sleeve having a plurality of recesses, each recess of the plurality of recesses receiving at least one battery cell of the plurality of battery cells disposed therein.

14. The battery of claim 13, further comprising at least one rack received in the support structure, the plurality of battery cells being one of:
a) mounted to and
b) received in
the at least one rack.

15. The battery of claim 13, wherein:
the battery includes a battery management module, and a battery management module sleeve;
the battery management module sleeve is positioned on the support structure to define an additional air passage between the battery management module sleeve and at least one of the sleeves of the heat exchangers; and
the battery management module is received in the battery management module sleeve.

16. The battery of claim 13, further comprising a battery management module positioned on the support structure and electrically connected to the plurality of battery cells.

* * * * *